US012771503B2

(12) United States Patent
Lei et al.

(10) Patent No.: US 12,771,503 B2
(45) Date of Patent: *Oct. 20, 2026

(54) INTERFERENCE MANAGEMENT FOR TWO-STEP RANDOM ACCESS

(71) Applicant: QUALCOMM Incorporated, San Diego, CA (US)

(72) Inventors: Jing Lei, San Diego, CA (US); Wanshi Chen, San Diego, CA (US); Yiqing Cao, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 18/673,218

(22) Filed: May 23, 2024

(65) Prior Publication Data

US 2024/0314850 A1 Sep. 19, 2024

Related U.S. Application Data

(63) Continuation of application No. 17/433,922, filed as application No. PCT/CN2020/077898 on Mar. 5, 2020, now Pat. No. 12,016,054.

(30) Foreign Application Priority Data

Mar. 8, 2019 (WO) ................ PCT/CN2019/077474

(51) Int. Cl.
*H04L 5/00* (2006.01)
*H04W 74/0833* (2024.01)
*H04W 74/0836* (2024.01)

(52) U.S. Cl.
CPC ....... *H04L 5/0048* (2013.01); *H04W 74/0833* (2013.01); *H04W 74/0836* (2024.01)

(58) Field of Classification Search
CPC ............ H04L 5/0048; H04W 74/0833; H04W 74/0836; H04W 74/006; H04W 74/04; H04W 74/08; H04W 72/12
See application file for complete search history.

(56) References Cited

U.S. PATENT DOCUMENTS 8,923,249 B2 12/2014 Kim et al.
10,122,371 B2 11/2018 Staszewski et al.
(Continued)

FOREIGN PATENT DOCUMENTS

CN 101064728 A 10/2007
CN 101978628 A 2/2011
(Continued)

OTHER PUBLICATIONS

CATT: "Discussion on Channel Structure for 2-Step RACH", 3GPP TSG RAN WG1 Meeting #96, R1-1902027, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, 5 Pages, Feb. 16, 2019, XP051599723, section 2.1, p. 2, paragraph 2.1—p. 3, figure 2.
(Continued)

*Primary Examiner* — Mohamed A Kamara
(74) *Attorney, Agent, or Firm* — Holland & Hart LLP/Qualcomm

(57) ABSTRACT

Methods, systems, and devices for wireless communications are described. A base station may receive, from a user equipment (UE), a first random access message of a two-step random access procedure. In some examples, the first random access message may be transmitted by the UE based on one or more cell-specific transmission parameters or cell-specific transmission schemes. The base station may transmit, to the UE, a second random access response message of the two-step random access procedure in response to the first random access message. The second random access
(Continued)

response message being transmitted based on one or more cell-specific transmission parameters or cell-specific transmission schemes. Accordingly, the base station and the UE may establish a connection with the UE based on the first random access message and the second random access response message, or the base station can indicate to the UE to return to an inactive mode or idle state.

19 Claims, 22 Drawing Sheets

(56) References Cited

U.S. PATENT DOCUMENTS

| | | | |
|---|---|---|---|
| 2012/0113929 | A1 | 5/2012 | Lee et al. |
| 2015/0334756 | A1 | 11/2015 | Lu et al. |
| 2017/0251499 | A1 | 8/2017 | Radulescu et al. |
| 2018/0124626 | A1 | 5/2018 | Tsai et al. |
| 2018/0139785 | A1 | 5/2018 | Zhang et al. |
| 2018/0205516 | A1 | 7/2018 | Jung et al. |
| 2019/0132882 | A1* | 5/2019 | Li ........................ H04L 27/2605 |
| 2019/0327764 | A1* | 10/2019 | Yoo ........................... H04L 1/08 |
| 2019/0387553 | A1 | 12/2019 | Gong et al. |
| 2021/0153259 | A1* | 5/2021 | Wu ........................ H04L 1/1812 |
| 2021/0195676 | A1* | 6/2021 | Wang ................. H04B 7/06964 |
| 2021/0329703 | A1* | 10/2021 | Yang ........................ H04L 5/001 |
| 2022/0053567 | A1 | 2/2022 | Lei et al. |
| 2022/0124813 | A1* | 4/2022 | Cao ........................ H04L 5/0044 |
| 2024/0407007 | A1* | 12/2024 | Huang ................ H04W 74/002 |

FOREIGN PATENT DOCUMENTS

| | | | |
|---|---|---|---|
| CN | 102843777 | A | 12/2012 |
| CN | 102883459 | A | 1/2013 |
| CN | 104735627 | A | 6/2015 |
| CN | 105722213 | A | 6/2016 |
| CN | 107690191 | A | 2/2018 |
| CN | 107787602 | A | 3/2018 |
| CN | 110383723 | A | 10/2019 |
| EP | 3435724 | A1 | 1/2019 |
| WO | 2009120828 | A1 | 10/2009 |
| WO | 2017078783 | A1 | 5/2017 |
| WO | 2018064367 | A1 | 4/2018 |
| WO | 2018118218 | A1 | 6/2018 |

OTHER PUBLICATIONS

International Preliminary Report on Patentability—PCT/CN2019/077474—The International Bureau of WIPO—Geneva, Switzerland—Sep. 23, 2021 (191720WO1).

International Preliminary Report on Patentability—PCT/CN2020/077898—The International Bureau of WIPO—Geneva, Switzerland—Sep. 23, 2021 (191720WO2).

International Search Report and Written Opinion—PCT/CN2019/077474—ISA/EPO—Nov. 22, 2019 (191720WO1).

International Search Report and Written Opinion—PCT/CN2020/077898—ISA/EPO—May 28, 2020 (191720WO2).

LG Electronics: "Data Transmission During Random Access Procedure in NB-IoT," 3GPP TSG RAN WG1 Meeting #88bis, R1-1704853, Apr. 7, 2017(Apr. 7, 2017) section 2, 6 pages, Mar. 25, 2017.

Qualcomm Incorporated: "Channel Structure for Two-Step RACH", 3GPP TSG-RAN WG1 Meeting #96, R1-1902977, Channel Structure for Two-step RACH, 3rd Generation Partnership Project, Mobile Competence Centre, 650, Route Des Lucioles, F-06921, Sophia-Antipolis Cedex, France, vol. RAN WG1, No. Athens, Greece, Feb. 25, 2019-Mar. 1, 2019, 10 Pages, Feb. 16, 2019, XP051600674, Proposal 5, p. 8, p. 3, Paragraph 2.2, Figure 3.

Supplementary European Search Report—EP20769776—Search Authority—The Hague—Sep. 15, 2022 (191720EP).

ZTE: "Summary of 7.2.1.1 Channel Structure for Two-Step RACH", 3GPP TSG RAN WG1 #96, R1-1903435, 3rd Generation Partnership Project, Mobile Competence Centre, 650, Route Des Lucioles, F-06921 Sophia-Antipolis Cedex, France, Athens, Greece, Feb. 25-Mar. 1, 2019, Mar. 1, 2019, XP051690819, Mar. 3, 2019, 28 Pages, p. 5, para 2.4.2, Chapters 1, 2.1, 2.2, 2.4.2, 2.6, Appendices A and B, the whole document.

* cited by examiner

INTERFERENCE MANAGEMENT FOR TWO-STEP RANDOM ACCESS

CROSS-REFERENCE TO RELATED APPLICATIONS

The present Application is continuation of U.S. patent application Ser. No. 17/433,922 by Lei et al., entitled "INTERFERENCE MANAGEMENT FOR TWO-STEP RANDOM ACCESS," filed Aug. 25, 2021, which is a 371 national phase filing of International Patent No. PCT/CN2020/077898 by Lei et al., entitled "INTERFERENCE MANAGEMENT FOR TWO-STEP RANDOM ACCESS," filed Mar. 5, 2020, which claims priority to International Patent Application No. PCT/CN2019/077474 by Lei et al., entitled "INTERFERENCE MANAGEMENT FOR TWO-STEP RANDOM ACCESS," filed Mar. 8, 2019, each of which is assigned to the assignee hereof, and each of which is expressly incorporated by reference in its entirety herein.

BACKGROUND

The following relates generally to wireless communications, and more specifically to interference management for two-step random access.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless systems may support one or more random access procedures for establishing a connection between a UE and a base station. The random access procedures may involve a series of handshake messages exchanged between the UE and the base station. In some examples, UEs may experience inter-cell interference from other UEs in neighboring cells during a random access procedure.

SUMMARY

The described techniques relate to improved methods, systems, devices, and apparatuses that enable base stations (e.g., a next-generation NodeB ((gNB)) and user equipments (UEs) to exchange a series of handshake messages associated with a random access procedure, while reducing or mitigating inter-cell interference due to contention-based random access inherency. For example, a base station and a UE may effectively exchange random access messages (e.g., messages A (msg A) and messages B (msg B)) of a two-step random access procedure, while reducing inter-cell interference, by communicating random access messages based on one or more cell-specific transmission parameters or cell-specific transmission schemes. A cell-specific transmission parameter or cell-specific transmission scheme may include a cell-specific preamble occasion, a cell-specific physical uplink shared channel (PUSCH) occasion, a cell-specific hopping sequence of a PUSCH occasion, a cell-specific scrambling sequence for scrambling random access messages (e.g., a preamble of msg A, a payload of msg A, or msg B), a cell-specific search space for random access messages (e.g., msg B), or a cell-specific pathloss compensation factor for open-loop power control, or a combination thereof.

A method of wireless communication at a UE in a cell is described. The method may include transmitting, to a base station serving the cell, a first random access message of a two-step random access procedure, the first random access message including a random access preamble and a random access payload, at least one of the random access preamble or the random access payload being transmitted based at least in part on one or more cell-specific transmission parameters or cell-specific transmission schemes, receiving, from the base station, a second random access response message of the two-step random access procedure in response to the first random access message, and establishing a connection with the base station based at least in part on the first random access message and the second random access response message.

An apparatus for wireless communication in a cell is described. The apparatus may include a processor, memory coupled with the processor, and instructions stored in the memory. The instructions may be executable by the processor to cause the apparatus to transmit, to a base station serving the cell, a first random access message of a two-step random access procedure, the first random access message including a random access preamble and a random access payload, at least one of the random access preamble or the random access payload being transmitted based at least in part on one or more cell-specific transmission parameters or cell-specific transmission schemes, receive, from the base station, a second random access response message of the two-step random access procedure in response to the first random access message, and establish a connection with the base station based at least in part on the first random access message and the second random access response message.

Another apparatus for wireless communication in a cell is described. The apparatus may include means for transmitting, to a base station serving the cell, a first random access message of a two-step random access procedure, the first random access message including a random access preamble and a random access payload, at least one of the random access preamble or the random access payload being transmitted based at least in part on one or more cell-specific transmission parameters or cell-specific transmission schemes, means for receiving, from the base station, a second random access response message of the two-step random access procedure in response to the first random access message, and means for establishing a connection with the base station based at least in part on the first random access message and the second random access response message.

A non-transitory computer-readable medium storing code for wireless communication at a UE in a cell is described. The code may include instructions executable by a processor to transmit, to a base station serving the cell, a first random access message of a two-step random access procedure, the first random access message including a random access preamble and a random access payload, at least one of the random access preamble or the random access payload being transmitted based at least in part on one or more cell-specific transmission parameters or cell-specific transmission schemes, receive, from the base station, a second random access response message of the two-step random access procedure in response to the first random access message, and establish a connection with the base station based at least in part on the first random access message and the second random access response message.

Some examples of the method, apparatuses, and non-transitory computer-readable medium described herein may further include operations, features, means, or instructions for receiving a cell-specific configuration for transmission of the random access preamble, and identifying, from the cell-specific configuration, one or more random access preamble transmission occasions, wherein the one or more random access preamble transmission occasions comprise time domain resources, frequency domain resources, or both, at least one of the time domain resources or frequency domain resources being the one or more cell-specific transmission parameters. In some examples of the method, apparatuses, and non-transitory computer-readable medium described herein, transmitting the first random access message may include operations, features, means, or instructions for transmitting the random access preamble on a physical random access channel (PRACH) during the one or more random access preamble transmission occasions.

Some examples of the method, apparatuses, and non-transitory computer-readable medium described herein may further include operations, features, means, or instructions for identifying a time domain offset or a frequency domain offset, or both, between the one or more random access preamble transmission occasions and a corresponding random access payload transmission occasion, wherein the one or more cell-specific transmission parameters comprise the time domain offset or the frequency domain offset. In some examples of the method, apparatuses, and non-transitory computer-readable medium described herein, transmitting the first random access message may include operations, features, means, or instructions for transmitting the random access payload on a physical uplink shared channel (PUSCH) in a random access payload transmission occasion based at least in part on the time domain offset or the frequency domain offset, or both.

Some examples of the method, apparatuses, and non-transitory computer-readable medium described herein for identifying the time domain offset or the frequency domain offset, or both may further include operations, features, means, or instructions for determining the time domain offset or the frequency domain offset, or both, based at least in part on a cell identifier of the cell.

Some examples of the method, apparatuses, and non-transitory computer-readable medium described herein for identifying the time domain offset or the frequency domain offset, or both may further include operations, features, means, or instructions for receiving a cell-specific configuration that includes the time domain offset, the frequency domain offset, or both.

Some examples of the method, apparatuses, and non-transitory computer-readable medium described herein may further include operations, features, means, or instructions for identifying a hopping sequence for transmission of the random access payload, wherein the hopping sequence is based at least in part on a time domain offset or a frequency domain offset, or both, between the random access preamble and the random access payload, wherein the one or more cell-specific transmission parameters include the time and frequency resources used for one or more transmission occasions defined by the hopping sequence. In some examples of the method, apparatuses, and non-transitory computer-readable medium described herein for transmitting the first random access message may include operations, features, means, or instructions for transmitting the random access payload on a PUSCH in a random access payload transmission occasion based at least in part on the hopping sequence.

Some examples of the method, apparatuses, and non-transitory computer-readable medium described herein for identifying the hopping sequence may further include operations, features, means, or instructions for determining the time domain offset or the frequency domain offset, or both, based at least in part on a cell identifier of the cell and one or more pseudo-random sequences.

In some examples of the method, apparatuses, and non-transitory computer-readable medium described herein, the generation of at least one of the pseudo-random sequences is based at least in part on the cell identifier.

Some examples of the method, apparatuses, and non-transitory computer-readable medium described herein for identifying the hopping sequence may further include operations, features, means, or instructions for receiving a cell-specific configuration for the hopping sequence.

Some examples of the method, apparatuses, and non-transitory computer-readable medium described herein may further include scrambling, for a first hop of the hopping sequence, information bits of the random access payload based at least in part on a first scrambling sequence that is a function of a first initialization value; scrambling, for a second hop of the hopping sequence, information bits of a second random access payload based at least in part on a second scrambling sequence that is a function of a second initialization value; and transmitting the random access payload on the PUSCH in a second random access payload transmission occasion based at least in part on the hopping sequence.

Some examples of the method, apparatuses, and non-transitory computer-readable medium described herein may further include operations, features, means, or instructions for determining a modified random access radio network temporary identifier based at least in part on a cell identifier, and scrambling the modified random access payload based at least in part on the modified random access radio network temporary identifier, wherein a scrambling sequence applied to information bits of the random access payload is a function of the cell identifier and ac UE identifier. In some examples of the method, apparatuses, and non-transitory computer-readable medium described herein for transmitting the first random access message may include operations, features, means, or instructions for transmitting the scrambled bits of the random access payload after channel coding.

Some examples of the method, apparatuses, and non-transitory computer-readable medium described herein for scrambling the random access payload may further include operations, features, means, or instructions for scrambling the information bits of random access payload based at least in part on a random access preamble identifier.

Some examples of the method, apparatuses, and non-transitory computer-readable medium described herein for scrambling the information bits of random access payload may further include operations, features, means, or instructions for scrambling the information bits of random access payload based at least in part on the port index of a demodulation reference signal.

Some examples of the method, apparatuses, and non-transitory computer-readable medium described herein may further include operations, features, means, or instructions for determining a transmission power for transmission of the first random access message based at least in part on a pathloss compensation factor, wherein the one or more cell-specific transmission parameters include the pathloss compensation factor and the pathloss compensation factor is different from neighboring cell pathloss compensation factors used by other UEs in neighboring cells during same transmission occasions. In some examples of the method, apparatuses, and non-transitory computer-readable medium described herein, transmitting the first random access message may include operations, features, means, or instructions for transmitting the first random access message based at least in part on the transmission power.

In some examples of the method, apparatuses, and non-transitory computer-readable medium described herein, the pathloss compensation factor is based at least in part on a value of a transmission occasion of the first random access message.

Some examples of the method, apparatuses, and non-transitory computer-readable medium described herein for receiving the second random access response message may further include operations, features, means, or instructions for monitoring a search space for one or more control channel elements during a random access response window, wherein the one or more control channel elements are orthogonal in frequency to one or more control channel elements of a second search space associated with other UEs of neighboring cells.

Some examples of the method, apparatuses, and non-transitory computer-readable medium described herein for receiving the second random access response message may further include operations, features, means, or instructions for descrambling a cyclic redundancy check associated with control information for the second random access response message based at least in part on a modified random access radio network temporary identifier or a cell identifier, or both. In some examples of the method, apparatuses, and non-transitory computer-readable medium described herein, the modified random access radio network temporary identifier is based at least in part on the cell identifier.

In some examples of the method, apparatuses, and non-transitory computer-readable medium described herein, the random access radio network temporary identifier is used for a radio resource control idle mode, a radio resource control inactive mode, and a radio resource connected mode.

A method of wireless communication at a base station serving a cell is described. The method may include receiving, from a UE served by the cell, a first random access message of a two-step random access channel procedure, transmitting, to the UE, a second random access response message of the two-step random access channel procedure in response to the first random access message, the second random access response message being transmitted based at least in part on one or more cell-specific transmission parameters or cell-specific transmission schemes, and establishing a connection with the UE based at least in part on the first random access message and the second random access response message.

An apparatus for wireless communication serving a cell is described. The apparatus may include a processor, memory coupled with the processor, and instructions stored in the memory. The instructions may be executable by the processor to cause the apparatus to receive, from a UE served by the cell, a first random access message of a two-step random access channel procedure, transmit, to the UE, a second random access response message of the two-step random access channel procedure in response to the first random access message, the second random access response message being transmitted based at least in part on one or more cell-specific transmission parameters or cell-specific transmission schemes, and establish a connection with the UE based at least in part on the first random access message and the second random access response message.

Another apparatus for wireless communication serving a cell is described. The apparatus may include means for receiving, from a UE served by the cell, a first random access message of a two-step random access channel procedure, means for transmitting, to the UE, a second random access response message of the two-step random access channel procedure in response to the first random access message, the second random access response message being transmitted based at least in part on one or more cell-specific transmission parameters or cell-specific transmission schemes, and means for establishing a connection with the UE based at least in part on the first random access message and the second random access response message.

A non-transitory computer-readable medium storing code for wireless communication at a base station serving a cell is described. The code may include instructions executable by a processor to receive, from a UE served by the cell, a first random access message of a two-step random access channel procedure, transmit, to the UE, a second random access response message of the two-step random access channel procedure in response to the first random access message, the second random access response message being transmitted based at least in part on one or more cell-specific transmission parameters or cell-specific transmission schemes, and establish a connection with the UE based at least in part on the first random access message and the second random access response message.

Some examples of the method, apparatuses, and non-transitory computer-readable medium described herein for transmitting the second random access response message may include operations, features, means, or instructions for configuring a search space for transmission of one or more control channel elements during a random access response window, wherein the one or more control channel elements are the one or more cell-specific transmission parameters and are orthogonal in frequency to one or more control channel elements of a second search space associated with the random access messages transmitted by other base stations in the neighboring cells.

Some examples of the method, apparatuses, and non-transitory computer-readable medium described herein for transmitting the second random access response message may include operations, features, means, or instructions for scrambling a cyclic redundancy check associated with control information for the second random access response message based at least in part on a modified random access radio network temporary identifier or a cell identifier, or both. In some examples of the method, apparatuses, and non-transitory computer-readable medium described herein, the modified random access radio network temporary identifier is based at least in part on the cell identifier and the scrambled cyclic redundancy check is the one or more cell-specific transmission schemes.

Some examples of the method, apparatuses, and non-transitory computer-readable medium described herein, receiving the first random access message may include operations, features, means, or instructions for receiving a random access preamble and a random access payload, at least one of the random access preamble or the random access payload being received based at least in part on one or more cell-specific transmission parameters or cell-specific transmission schemes that are different from random access transmission parameters or schemes used by other UEs in the neighboring cells.

Some examples of the method, apparatuses, and non-transitory computer-readable medium described herein may further include operations, features, means, or instructions for transmitting a cell-specific configuration to the UE for transmission of the random access preamble, wherein the cell-specific configuration comprises one or more random access preamble transmission occasions, wherein the one or more random access preamble transmission occasions include time domain resources, frequency domain resources, or both, at least one of the time domain resources or frequency domain resources being different from resources used for random access preamble transmissions by other UEs in neighboring cells. In some examples of the method, apparatuses, and non-transitory computer-readable medium described herein for receiving the first random access message may include operations, features, means, or instructions for receiving the random access preamble on a PRACH during the one or more random access preamble transmission occasions.

Some examples of the method, apparatuses, and non-transitory computer-readable medium described herein may further include operations, features, means, or instructions for identifying a time domain offset or a frequency domain offset, or both, between the one or more random access preamble transmission occasions and a corresponding random access payload transmission occasion, wherein at least one of the time domain offset or the frequency domain offset is different from offsets used for random access payload transmission occasions by other UEs in neighboring cells. In some examples of the method, apparatuses, and non-transitory computer-readable medium described herein for receiving the first random access message may include operations, features, means, or instructions for receiving the random access payload on a PUSCH during a random access payload transmission occasion based at least in part on the time domain offset or the frequency domain offset, or both.

Some examples of the method, apparatuses, and non-transitory computer-readable medium described herein for identifying the time domain offset or the frequency domain offset, or both may further include operations, features, means, or instructions for determining the time domain offset or the frequency domain offset, or both, based at least in part on a cell identifier of the cell.

Some examples of the method, apparatuses, and non-transitory computer-readable medium described herein may further include operations, features, means, or instructions for identifying a hopping sequence for reception of the random access payload, wherein the hopping sequence is based at least in part on a time domain offset or a frequency domain offset, or both, between the random access preamble and the random access payload, wherein resources used for one or more transmission occasions defined by the hopping sequence are different from resources used for random access payload transmissions by other UEs in neighboring cells. In some examples of the method, apparatuses, and non-transitory computer-readable medium described herein for receiving the first random access message may include operations, features, means, or instructions for receiving the random access payload during a physical uplink shared channel occasion based at least in part on the hopping sequence.

Some examples of the method, apparatuses, and non-transitory computer-readable medium described herein for identifying the hopping sequence may further include operations, features, means, or instructions for determining the time domain offset or the frequency domain offset, or both, based at least in part on a cell identifier of the cell and one or more pseudo-random sequences.

In some examples of the method, apparatuses, and non-transitory computer-readable medium described herein, the generation for at least one of the pseudo-random sequences is based at least in part on the cell identifier.

Some examples of the method, apparatuses, and non-transitory computer-readable medium described herein may further include operations, features, means, or instructions for determining a modified random access radio network temporary identifier based at least in part on a cell identifier of the cell, and descrambling the information bits of random access payload based at least in part on the modified random access radio network temporary identifier. In some examples of the method, apparatuses, and non-transitory computer-readable medium described herein for receiving the first random access message may include operations, features, means, or instructions for receiving the descrambled information bits of random access payload.

Some examples of the method, apparatuses, and non-transitory computer-readable medium described herein for descrambling the information bits of random access payload may further include operations, features, means, or instructions for descrambling the information bits random access payload based at least in part on a random access preamble identifier.

Some examples of the method, apparatuses, and non-transitory computer-readable medium described herein for descrambling the information bits of random access payload may further include operations, features, means, or instructions for descrambling the random access payload based at least in part on a port index of demodulation reference signal.

Some examples of the method, apparatuses, and non-transitory computer-readable medium described herein, receiving the first random access message may include operations, features, means, or instructions for receiving the first random access message at a received power that is stronger than the interference from the random access messages transmitted by other UEs of neighboring cells.

Some examples of the method, apparatuses, and non-transitory computer-readable medium described herein may further include operations, features, means, or instructions for transmitting, to the UE, a first set of parameters for transmitting the first random access message, wherein the first set of parameters comprise power control parameters, cell-specific transmission parameters, cell specific transmission schemes, or any combination thereof.

DETAILED DESCRIPTION

Figure 1:
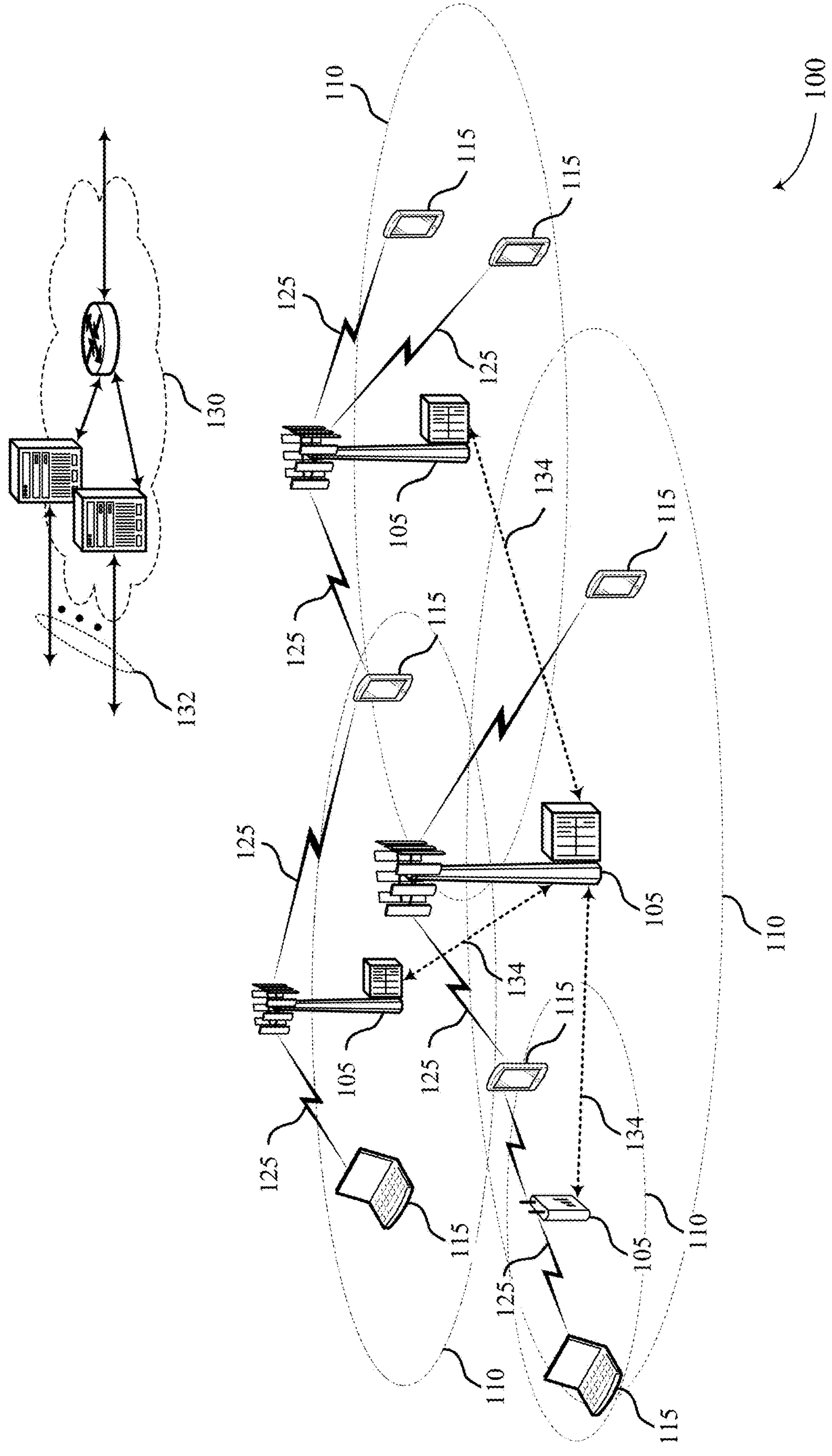
FIGS. 1 and 2 illustrate examples of a wireless communications system that supports interference management for a two-step random access procedure in accordance with aspects of the present disclosure.

Some wireless communication systems may have a user equipment (UE) and a base station (e.g., a next-generation NodeB or giga-NodeB (either of which may be referred to as a gNB)) establish a connection using a random access procedure. The random access procedure may include a series of handshake messages carrying information that facilitates establishing the connection between the UE and the base station. In some examples, a random access procedure may be a two-step random access procedure, which may reduce latency compared to other random access procedures that use a greater number of handshake messages (e.g., a four-step random access procedure). In two-step random access procedures, multiple UEs within a same cell or across neighboring cells may share a transmission occasion for transmitting random access messages (e.g., messages A (msg A)) and share a random access response window to monitor for a subsequent random access response message (e.g., messages B (msg B)). Because a random access procedure may be contention-based, detecting random access messages (e.g., msg A) at a base station may be affected by intra-cell and inter-cell interference. Additionally, when two-step random access procedures are ongoing in neighboring cells that also have similar transmission occasions, detecting random access response messages (e.g., msg B) may too suffer from inter-cell interference. Therefore, it may be advantageous for base stations and UEs to mitigate inter-cell interference associated with two-step random access procedures and improve reliability of random access messaging (e.g., msg A and msg B). It may also be advantageous to enable base stations and UEs to transmit and receive random access messages associated with a two-step random access procedure according to cell-specific transmission parameters or cell-specific transmission schemes.

To achieve the aforementioned advantages, UEs in a cell may transmit, to base stations serving the cell, a first random access message (e.g., msg A) of a two-step random access procedure. The first random access message may include a random access preamble and a random access payload. In some examples, the random access preamble or the random access payload may be transmitted based on one or more cell-specific transmission parameters or cell-specific transmission schemes, so as to be distinguishable from random access messages transmitted by other UEs in neighboring cells. Similarly, base stations may transmit, to UEs, a second random access response message (e.g., msg B) of the two-step random access procedure in response to the first random access message (e.g., msg A). Here, the second random access response message may be transmitted, based on one or more cell-specific transmission parameters or cell-specific transmission schemes, so as to be distinguishable from random access response messages transmitted by other base stations in neighboring cells. A cell-specific transmission parameter or a cell-specific transmission scheme may include a cell-specific preamble occasion, a cell-specific physical uplink shared channel (PUSCH) occasion, a cell-specific hopping sequence of the PUSCH occasion, a cell-specific scrambling sequence for scrambling the first random access message (e.g., msg A) or the second random access response message (e.g., msg B), a cell-specific search space for the random access messages, or alternating pathloss compensation for open-loop power control, or a combination thereof.

Aspects of the disclosure are initially described in the context of a wireless communications system. Aspects of the disclosure are then illustrated by and described with reference to cell-specific configurations and process flows that relate to interference management for a two-step random access procedure. Aspects of the disclosure are further illustrated by and described with reference to apparatus diagrams, system diagrams, and flowcharts that relate to interference management for a two-step random access procedure.

FIG. 1 illustrates an example of a wireless communications system 100 that supports interference management for a two-step random access procedure in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHZ, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHZ ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (STTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHZ, etc.) at reduced symbol durations (e.g., 16.67 microseconds). A TTI in CC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base station 105 may perform a connection procedure (e.g., a radio resource control (RRC) procedure, such as a cell acquisition procedure, a random access procedure, an RRC connection procedure, or an RRC configuration procedure) with UE 115. For example, base station 105 and UE 115 may perform a random access procedure to establish a connection (e.g., communication link 125). In other examples, base station 105 and UE 115 may perform a random access procedure to re-establish a connection after connection failure (e.g., a radio-link failure) with base station 105, or to establish a connection for handover to another base station 105, or the like. As part of the random access procedure, UE 115 may transmit a random access preamble. This may enable base station 105 to distinguish between multiple UEs 115 attempting to access wireless communications system 100.

In some examples, base station 105 may respond with a random access response message that provides an uplink resource grant, a timing advance, among other information. UE 115 may then transmit an RRC connection request along with a temporary mobile subscriber identity (TMSI) (if UE 115 has previously been connected to the same wireless network) or a random identifier. The RRC connection request may also indicate the reason UE 115 is connecting to the network (e.g., emergency, signaling, data exchange, etc.). Base station 105 may respond to the connection request with a contention resolution message addressed to UE 115, which may provide a radio network temporary identifier (RNTI). If UE 115 receives a contention resolution message with the correct identification, it may proceed with RRC connection setup. If UE 115 does not, however, receive a contention resolution message (e.g., if there is a conflict with another UE 115) it may repeat the random access process by transmitting a new random access preamble. Such exchange of messages between UE 115 and base station 105 for random access may be referred to as a four-step random access procedure.

In other examples, it may be more advantageous for UEs 115 and base stations 105 to perform a two-step random access procedure over a four-step random access procedure for random access. For instance, UEs 115 that operate in licensed or unlicensed spectrum within wireless communications system 100 may participate in a two-step random access procedure to reduce delay in establishing communication with base stations 105 (e.g., as compared to a four-step random access procedure), as well as reduce power consumption of UEs 115 and decrease overhead signaling to UEs 115. In some examples, a two-step random access procedure may be applicable to any cell size, may work regardless of whether a random access procedure is contention-based or contention-free, and may combine multiple random access messages from a four-step random access procedure. For example, a first random access message (e.g., msg A), sent from UE 115 to base station 105, may combine contents of a random access message 1 and message 3 from a four-step random access procedure. Additionally, msg A may consist of a random access preamble and a PUSCH carrying a payload with contents of the message (e.g., equivalent to message 3). In some cases, base station 105 may transmit a downlink control channel (e.g., a physical downlink control channel (PDCCH)) and a corresponding second random access response message (e.g., msg B) to UE 115, where msg B may combine equivalent contents of a random access message 2 and message 4 from a four-step random access procedure.

In two-step random access procedures, multiple UEs 115 within a same cell or across neighboring cells may share a transmission occasion for communicating random access messages (e.g., msg A), as well as share a random access response window to monitor for a subsequent random access response message (e.g., msg B). When two-step random access procedures are contention-based random, msg A detection may be affected by intra-cell and inter-cell interference. Additionally, when two-step random access procedures are ongoing in neighboring cells that also have similar transmission occasions, detection of msg B may also suffer from inter-cell interference. It may be advantageous, therefore, for base stations 105 and UEs 115 to alleviate inter-cell interference associated with two-step random access procedures and improve reliability of random access messaging.

To avoid inter-cell interference, UEs 115 in a cell may transmit, to base station 105 serving the cell, a first random access message (e.g., msg A) of a two-step random access procedure. The first random access message may include a random access preamble and a random access payload. In some examples, to achieve the above advantages, at least one of the random access preamble or the random access payload may be transmitted, based on one or more cell-specific transmission parameters or cell-specific transmission schemes, so as to be distinguishable from random access messages transmitted by other UEs 115 in neighboring cells. Similarly, base stations 105 may transmit, to UEs 115, a second random access response message (e.g., msg B) of the two-step random access procedure in response to the first random access message (e.g., msg A). Here, the second random access response message may be transmitted, based on one or more cell-specific transmission parameters or cell-specific transmission schemes, so as to also be distinguishable from random access response messages transmitted by other base stations 105 in neighboring cells.

Accordingly, the techniques described herein may provide efficacy to UEs 115 by reducing or eliminating latencies associated with processes related to initial channel access (e.g., minimizing or eliminating inter-cell interference associated with random access messaging of two-step random access procedures), and more specifically enabling UEs 115 and base stations 105 with cell-specific transmission parameters or cell-specific transmission schemes, or both for transmission and reception of random access messages (e.g., msg A, msg B).

Figure 2:
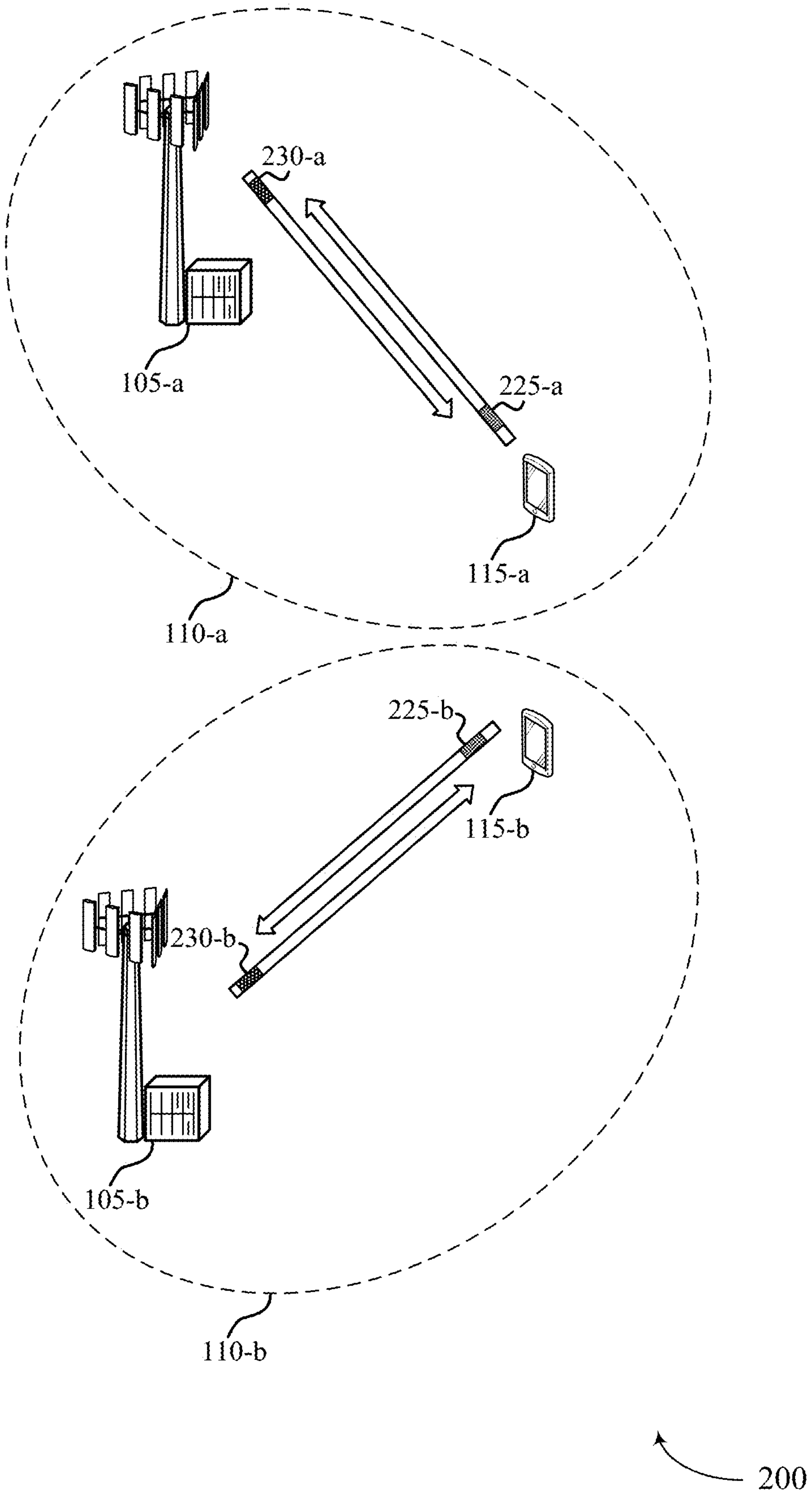

FIG. 2 illustrates an example of a wireless communications system 200 that supports interference management for a two-step random access procedure in accordance with aspects of the present disclosure. Wireless communications system 200 may include base station 105-*a* and UE 115-*a* within cell 110-*a* and base station 105-*b* and UE 115-*b* within cell 110-*b*, which may be examples of the corresponding devices described with reference to FIG. 1. In some examples, wireless communications system 200 may implement aspects of wireless communications system 100. For example, base stations 105 and UEs 115 may support improvements in interference management of random access messaging for two-step random access procedures.

Base station 105 may perform a connection procedure (e.g., a random access procedure) with UE 115. For example, base station 105-*a* and UE 115-*a* may perform a random access procedure to establish a connection for wireless communication. In other examples, base station 105-*b* and UE 115-*b* may perform a random access procedure to re-establish a connection after connection failure with base station 105-*b*, or to establish a connection for handover to another base station (e.g., base station 105-*a*), or the like. Base stations 105-*a*, 105-*b* and UEs 115-*a*, 115-*b* may also support multiple radio access technologies including 4G systems such as LTE systems, LTE-A systems, or LTE-A Pro systems, and 5G systems which may be referred to as NR systems.

The connection procedure between base stations 105-*a*, 105-*b* and UEs 115-*a*, 115-*b* may correspond to, for example, at least one of the above example radio access technologies. By way of example, a random access procedure may be related to 4G systems and may be referred to as a four-step random access procedure. As part of the four-step random access procedure, base stations 105-*a*, 105-*b* and UEs 115-*a*, 115-*b* may transmit one or more messages (e.g., handshake messages), such as a random access message (also referred to herein as msg 1), a second random access message (also referred to herein as msg 2), a third random access response message (also referred to herein as msg 3), and a fourth random access response message (also referred to herein as msg 4).

In a four-step random access procedure, the procedure may commence with UEs 115-*a*, 115-*b* transmitting msg 1, which may include a preamble (also referred to as a random access preamble, a physical random access preamble, or a sequence) that may carry information, such as a UE identifier. The purpose of the preamble transmission may be to provide an indication to base stations 105-*a*, 105-*b* of a presence of a random access attempt, and to allow base stations 105-*a*, 105-*b* to determine a delay (e.g., a timing delay) between base stations 105-*a*, 105-*b* and UEs 115-*a*, 115-*b*. In some examples, UEs 115-*a*, 115-*b* may transmit msg 1 to base stations 105-*a*, 105-*b* on a physical random access channel (PRACH).

The preamble of msg 1 may, in some examples, be defined by a preamble sequence and a cyclic prefix. A preamble sequence may be defined based in part on a Zadoff-Chu sequence. UEs 115-*a*, 115-*b* may additionally, or alternatively, use a guard period to handle timing uncertainty of msg 1 transmission. For example, before beginning the random access procedure, UEs 115-*a*, 115-*b* may obtain downlink synchronization with base stations 105-*a*, 105-*b* based on a cell-search procedure. However, because UEs 115-*a*, 115-*b* may have not yet obtained uplink synchronization with base stations 105-*a*, 105-*b*, there may be an uncertainty in uplink timing due to the location of UEs 115-*a*, 115-*b* in cell 110-*a*, 110-*b* (e.g., geographic coverage area of base stations 105-*a*, 105-*b*) not being known. In some examples, the uncertainty in uplink timing may be based on a dimension (e.g., size, area) of cell 110-*a*, 110-*b*. Therefore, appending a cyclic prefix to msg 1 may be beneficial, in some examples, for handling the uncertainty in uplink timing.

Upon receiving msg 1, base stations 105-*a*, 105-*b* may respond appropriately with msg 2. For example, base stations 105-*a*, 105-*b* may transmit msg 2 to UEs 115-*a*, 115-*b* on a downlink shared channel (DL-SCH) or a PDCCH. In some examples, msg 2 may have a same or a different configuration (format) compared to msg 1. In some examples, msg 2 may carry information for UEs 115-*a*, 115-*b*, where the information may be determined by base stations 105-*a*, 105-*b* based on information carried in msg 1. For example, information in msg 2 may include an index of a preamble sequence detected and for which the response is valid, a timing advance parameter determined based on the preamble sequence detected, a scheduling grant indicating time and frequency resources for UEs 115-*a*, 115-*b* to use for transmission of a next random access message transmission by UEs 115-*a*, 115-*b*, or a network identifier for further communication with UEs 115-*a*, 115-*b*, or the like.

In some examples, msg 2 may be scheduled on a PDCCH using an identity reserved for random access messaging, for example, a RNTI. UEs 115-*a*, 115-*b* may monitor a PDCCH to detect and receive a random access message (e.g., msg 2). In some examples, UEs 115-*a*, 115-*b* may monitor the PDCCH for a random access message transmission from base stations 105-*a*, 105-*b* during a random access response window, which may be fixed or variable in size. For example, if UEs 115-*a*, 115-*b* do not detect and receive a random access message transmission from base stations 105-*a*, 105-*b*, the random access attempt may be declared as a failure and the random access procedure may repeat. However, in the subsequent attempt, the random access response window may be adjusted (e.g., increased or decreased in length (duration)).

Once UEs 115-*a*, 115-*b* successfully receive msg 2, UEs 115-*a*, 115-*b* may obtain uplink synchronization with base stations 105-*a*, 105-*b*. In some examples, before data transmission from UEs 115-*a*, 115-*b*, a unique identifier within cell 110-*a*, 110-*b* may be assigned to UEs 115-*a*, 115-*b*. In some examples, depending on a state (e.g., connected_state, idle state) of UEs 115-*a*, 115-*b* there may be a need for additional message (e.g., a connection request message) exchange for setting up the connection between base stations 105-*a*, 105-*b* and UEs 115-*a*, 115-*b*. Thus, UEs 115-*a*, 115-*b* may transmit any necessary messages, for example, a msg 3 to base stations 105-*a*, 105-*b* using UL-SCH resources (or PUSCH resources) assigned in msg 2. The msg 2 may include a UE identifier for contention resolution. If UEs 115-*a*, 115-*b* are in a connected_state, for example, the UE identifier may be a cell radio network temporary identifier (C-RNTI). Otherwise, the UE identifier may be specific to UEs 115-*a*, 115-*b*.

Base stations 105-*a*, 105-*b* may receive msg 3 and may respond properly, for example, by transmitting msg 4, which may be a contention resolution message. As a result of the contention resolution message, base stations 105-*a*, 105-*b* and UEs 115-*a*, 115-*b* may establish a connection for communication. Although, the four-step random access procedure may be effective for facilitating random access for UEs 115-*a*, 115-*b*, there may be unnecessary latencies associated with this procedure. For example, latencies related to contention-based protocol of random access messaging may exhaust additional resources of UEs 115-*a*, 115-*b*. Therefore, it may be advantageous for UEs 115-*a*, 115-*b* to support a two-step random access procedure to reduce power consumption, as well as overhead signaling for UEs 115-*a*, 115-*b*.

A two-step random access procedure may be related to 5G systems. As part of a two-step random access procedure, to decrease latencies related to contention-based aspects of the two-step random access procedure, base stations 105-*a*, 105-*b* and UEs 115-*a*, 115-*b* may exchange fewer messages (e.g., handshake messages) compared to a four-step random access procedure. For example, UEs 115-*a*, 115-*b* may transmit a single message, such as a random access message 225 (also referred to herein as msg A), and base stations 105-*a*, 105-*b* may transmit a single message, such as a random access response message 230 (also referred to herein as msg B) in response to the random access message 225. The random access message 225 may combine parts of msg 1 and msg 3 of a four-step random access procedure, while the random access response message 230 may combine aspects of msg 2 and msg 4 of the four-step random access procedure.

When supporting both two-step random access procedures, UEs 115-*a*, 115-*b* may transmit the random access messages 225 to base stations 105-*a*, 105-*b*. For example, UE 115-*a* may transmit random access message 225-*a* to base station 105-*a*, while UE 115-*b* may transmit random access message 225-*b* to base station 105-*b*. The random access messages 225 may include a preamble and a PUSCH carrying a payload, where information in the random access message 225 may include the equivalent contents or aspects of msg 3 of a four-step random access procedure.

Base stations 105-*a*, 105-*b* may monitor a PUSCH for a random access preamble or a payload of the random access messages 225. The payload may carry a connection request. In some examples, base stations 105-*a*, 105-*b* may determine an absence of the random access preamble or the payload of the random access messages 225 based on the monitoring. Absence of the random access preamble or the payload of the random access message 225 may result in a random access procedure failure. Otherwise, after successfully receiving the random access message 225, base stations 105-*a*, 105-*b* may transmit the random access response message 230 to UEs 115-*a*, 115-*b*. For example, base station 105-*a* (or base station 105-*b*) may transmit the random access response message 230-*a* (or the random access response message 230-*b*) to UE 115-*a* (or UE 115-*b*) on a DL-SCH, physical downlink shared channel (PDSCH), PDCCH.

In some examples, UEs 115-*a*, 115-*b* may share a transmission occasion for random access messages 225-*a*, 225-*b*, as well as share a random access response window to monitor for random access response messages 230-*a*, 230-*b*. Because the two-step random access procedure may be contention-based, communication of random access messages 225-*a*, 225-*b* may be affected by inter-cell interference. For example, base stations 105-*a*, 105-*b* may be affected by inter-cell interference when monitoring for random access messages 225-*a*, 225-*b*. Additionally, when two-step random access procedures are ongoing in neighboring cells 110 that also have similar transmission occasions, communication of random access response messages 230-*a*, 230-*b* may also suffer from inter-cell interference. For example, UEs 115-*a*, 115-*b* may be affected by inter-cell interference when monitoring for random access response messages 230-*a*, 230-*b*. Thus, it may be advantageous for base stations 105-*a*, 105-*b* and UEs 115-*a*, 115-*b* to mitigate the inter-cell interference by enabling UEs 115-*a*, 115-*b* and base stations 105-*a*, 105-*b* to use cell-specific transmission parameters or cell-specific transmission schemes, or both for transmission and reception of random access messages (e.g., msg A, msg B).

Figure 3A:
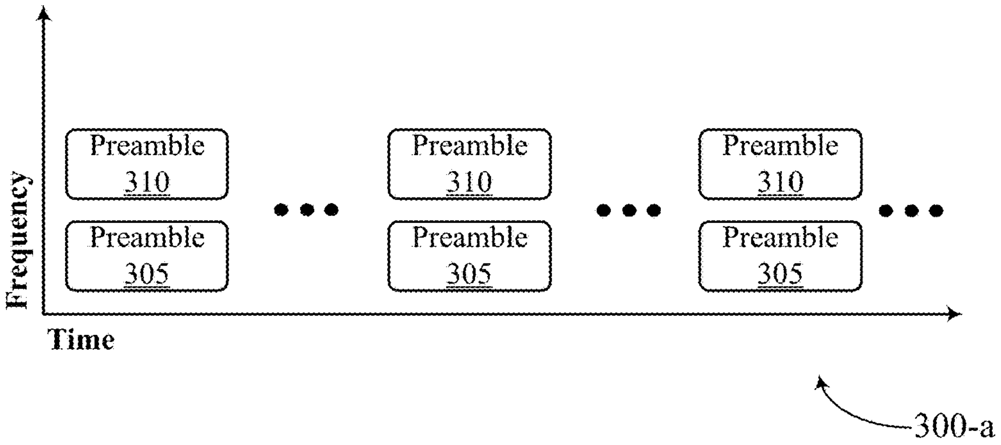
FIGS. 3A through 3C illustrate examples of a cell-specific configuration of preamble occasions that support interference management for a two-step random access procedure in accordance with aspects of the present disclosure.

FIG. 3A illustrates an example of a cell-specific configuration 300-*a* of preamble occasions that support interference management for a two-step random access procedure in accordance with aspects of the present disclosure. Cell-specific configuration 300-*a* may implement aspects of wireless communications systems 100 and 200, such as support improvements in interference management of random access messaging for two-step random access procedures. For example, cell-specific configuration 300-*a* may be a cell-specific configuration of preamble occasions, and more explicitly cell-specific configuration 300-*a* may illustrate transmission occasions of preambles 305, 310 according to frequency division multiplexing resources.

In a two-step random access procedure, with reference to FIG. 2, UE 115-*a* may be transmitting msg A (e.g., random access message 225-*a*) to base station 105-*a*, while UE 115-*b* may be transmitting msg A (e.g., random access message 225-*b*) to base station 105-*b* simultaneously. In some examples, with reference to FIG. 3A, UE 115-*a* may transmit a preamble 305 of msg A to base station 105-*a* on a PRACH, while UE 115-*b* may transmit a preamble 310 of msg A to base station 105-*b* on a PRACH. Each preamble 305, 310 may be associated with a preamble occasion (also referred to herein as random access preamble transmission occasion), in which UEs 115-*a*, 115-*b* may transmit preambles 305, 310. In some examples, UEs 115-*a*, 115-*b* may be at a cell edge, which may cause inter-cell interference between UEs 115-*a*, 115-*b* and reduce the performance of a two-step random access procedure. To decrease or eliminate inter-cell interference, UE 115-*a* may transmit preamble 305 of msg A to base station 105-*a* based on one or more cell-specific transmission parameters or cell-specific transmission schemes, so as to be distinguishable from random access messages (e.g., preambles 310 transmitted by UE 115-*b* in a neighboring cells), while UE 115-*b* may transmit preamble 310 of msg A to base station 105-*b* based on one or more cell-specific transmission parameters or cell-specific transmission schemes, so as to also be unique from random access messages (e.g., preambles 305 transmitted by UE 115-*a* in a neighboring cells).

By way of example, to be unique from random access messages transmitted by other UEs in neighboring cells, UEs 115-*a*, 115-*b* may transmit preambles of msg A to base stations 105-*a*, 105-*b* using cell-specific time and frequency resources. In an example, preamble transmissions may be frequency division multiplexed according to a cell-specific configuration, which may indicate time and frequency resources specific to cell 110-*a*, 110-*b* of UEs 115-*a*, 115-*b*. By frequency division multiplexing preamble transmissions, UEs 115-*a*, 115-*b* may be capable of preamble transmissions during a same temporal period (e.g., a slot), but on different frequency resources. For example, preamble 305 transmissions and preamble 310 transmissions may occur during a same slot but on diverse frequency resources.

In some examples, frequency resources for preamble 305, 310 transmissions may be configured by base stations 105-*a*, 105-*b* and indicated to UEs 115-*a*, 115-*b* appropriately (e.g., via dynamic signaling, RRC signaling). For example, base stations 105-*a*, 105-*b* may transmit a cell-specific configuration to UEs 115-*a*, 115-*b* indicating time and frequency resources for transmission of preambles 305, 310. The cell-specific configuration may include one or more transmission occasions for transmission of the preambles 305, 310. The one or more transmission occasions may be based on time domain resources, frequency domain resources, or both. In some examples, for preamble 305, 310 transmissions to be distinct, at least one of the time domain resources or frequency domain resources may be different from resources used for preamble transmissions by other UEs in neighboring cells.

Figure 3B:
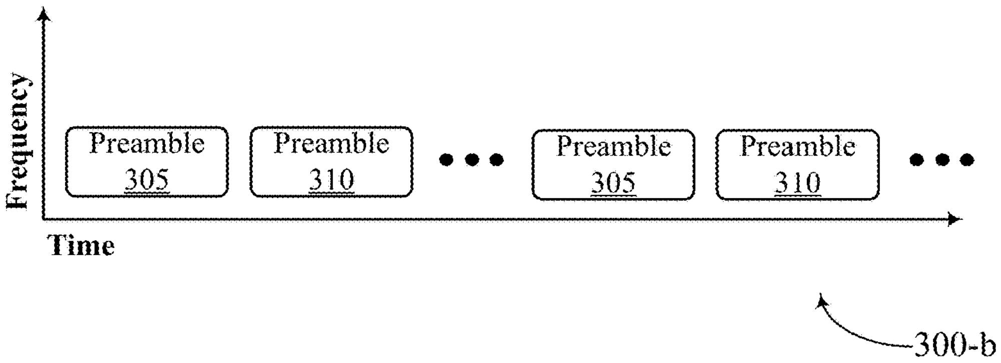

FIG. 3B illustrates an example of a cell-specific configuration 300-*b* of preamble occasions that support interference management for a two-step random access procedure in accordance with aspects of the present disclosure. Cell-specific configuration 300-*b* may implement aspects of wireless communications systems 100 and 200, such as support improvements in interference management of random access messaging for a two-step random access procedure. For example, cell-specific configuration 300-*b* may be a cell-specific configuration of preamble occasions, and more specifically cell-specific configuration 300-*b* may illustrate transmission of preambles 305, 310 according to time division multiplexing resources.

As part of a two-step random access procedure, with reference to FIG. 2, UE 115-*a* may be transmitting msg A (e.g., random access message 225-*a*) to base station 105-*a*, while UE 115-*b* may be transmitting msg A (e.g., random access message 225-*b*) to base station 105-*b* at the same time. In some examples, with reference to FIG. 3B, UE 115-*a* may transmit a preamble 305 of msg A to base station 105-*a* on a physical random access channel (PRACH), while UE 115-*b* may transmit a preamble 310 of msg A to base station 105-*b* on a physical random access channel (PRACH). Each preamble 305, 310 may be associated with a preamble occasion, in which UEs 115-*a*, 115-*b* transmit preambles 305, 310 to respective base stations 105-*a*, 105-*b* on a PRACH. UEs 115-*a*, 115-*b* may, in some examples, be at a cell edge of a cell. By being at a cell edge, UEs 115-*a*,

115-*b* may cause inter-cell interference to each other and degrade the two-step random access procedure. To alleviate the inter-cell interference, UE 115-*a* may transmit preamble 305 of msg A to base station 105-*a* based on one or more cell-specific transmission parameters or cell-specific transmission schemes, so as to be different from random access messages (e.g., preambles 310 transmitted by UE 115-*b* in a neighboring cells). Additionally, or alternatively, UE 115-*b* may transmit preamble 310 of msg A to base station 105-*b* based on one or more cell-specific transmission parameters or cell-specific transmission schemes, so as to also be distinguishable from random access messages (e.g., preambles 305 transmitted by UE 115-*a* in a neighboring cells).

In an example, to be distinct from random access messages transmitted by other UEs in neighboring cells, UEs 115-*a*, 115-*b* may transmit preambles of msg A to base stations 105-*a*, 105-*b* using cell-specific time and frequency resources. For example, preamble 305, 310 transmissions may be time division multiplexed according to a cell-specific configuration. By time division multiplexing preamble 305, 310 transmissions, UEs 115-*a*, 115-*b* may be capable of transmitting preamble 305, 310 transmissions on same frequency resources (e.g., subcarriers), but during different temporal periods (e.g., slots). For example, preamble 305, 310 transmissions may use identical frequency resources (e.g., subcarriers), but then diverse time resources (e.g., different slots).

The time resources may be configured by base stations 105 and indicated to UEs 115 appropriately (e.g., via dynamic signaling, RRC signaling). For example, base stations 105-*a*, 105-*b* may transmit a cell-specific configuration to UEs 115-*a*, 115-*b* for transmission of preambles 305, 310. The cell-specific configuration may include one or more transmission occasions for transmission of the preambles 305, 310. The one or more transmission occasions may be based on time domain resources, frequency domain resources, or both. In some examples, for preamble transmission to be distinguishable, at least one of the time domain resources or frequency domain resources may be different from resources used for preamble transmissions by other UEs 115 in neighboring cells.

Figure 3C:
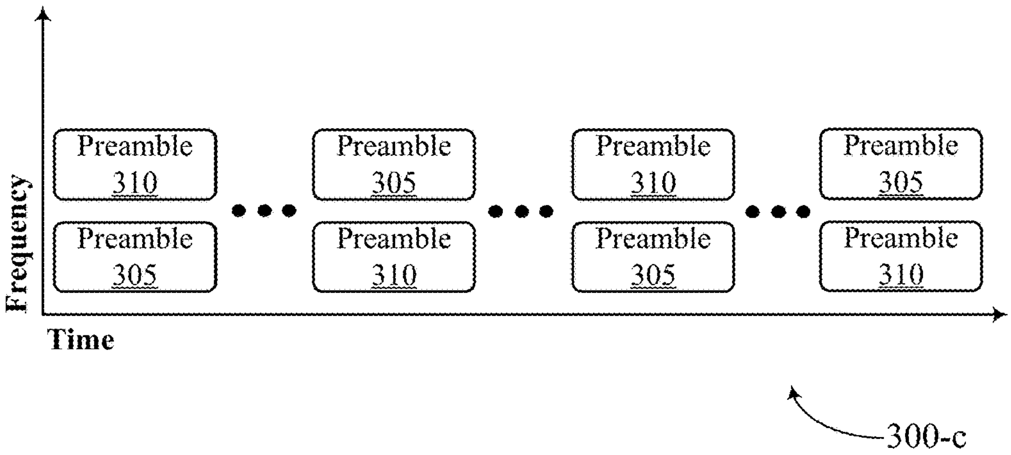

FIG. 3C illustrates an example of a cell-specific configuration 300-*c* of preamble occasions that support interference management for a two-step random access procedure in accordance with aspects of the present disclosure. Cell-specific configuration 300-*c* may implement aspects of wireless communications systems 100 and 200, such as support improvements in interference management of random access messaging for a two-step random access procedure. For example, cell-specific configuration 300-*c* may be a cell-specific configuration of preamble occasions, and more specifically cell-specific configuration 300-*c* may illustrate transmission of preambles 305, 310 according an interleaving of time and frequency division resources.

As part of a two-step random access procedure, with reference to FIG. 2, UE 115-*a* may be transmitting msg A (e.g., random access message 225-*a*) to base station 105-*a*, while UE 115-*b* may be transmitting msg A (e.g., random access message 225-*b*) to base station 105-*b* concurrently. With reference to FIG. 3C, UE 115-*a* may transmit a preamble 305 of msg A to base station 105-*a* on a PRACH, while UE 115-*b* may transmit a preamble 310 of msg A to base station 105-*b*. on a PRACH Preamble 305, 310 may be associated with a preamble occasion, in which UEs 115-*a*, 115-*b* may transmit preambles 305, 310. In some examples, UEs 115-*a*, 115-*b* may be at a cell edge of a cell including UEs 115-*a*, 115-*b*. For example, UE 115-*a* may be at a cell edge (of cell 110-*a*) associated with base station 105-*a*, while UE 115-*b* may be a cell edge (of cell 110-*b*) associated with base station 105-*b*. For being at the cell edge, UEs 115-*a*, 115-*b* may experience inter-cell interference from each other. As a result, UEs 115-*a*, 115-*b* may experience reduced quality of the two-step random access procedure.

To mitigate the inter-cell interference, UE 115-*a* may transmit preamble 305 of msg A to base station 105-*a* based on one or more cell-specific transmission parameters or cell-specific transmission schemes, so as to be distinguishable from random access messages (e.g., preambles 310 transmitted by UE 115-*b* in a neighboring cells), while UE 115-*b* may transmit preamble 310 of msg A to base station 105-*b* also based on one or more cell-specific transmission parameters or cell-specific transmission schemes, so as to also be distinguishable from random access messages (e.g., preambles 305 transmitted by UE 115-*a* in a neighboring cells). In an example, to be diverse from random access messages transmitted by other UEs in neighboring cells, UEs 115-*a*, 115-*b* may transmit preambles of msg A to base stations 105-*a*, 105-*b* using cell-specific time and frequency resources. For example, time and frequency resources associated with preamble 305, 310 transmissions may be interleaved according to a cell-specific configuration. By interleaving the time and frequency resources, UEs 115-*a*, 115-*b* may experience increased opportunities for preamble 305, 310 transmissions, as well as reduced or no inter-cell interference.

Time and frequency resources may be configured by base stations 105-*a*, 105-*b* and indicated to UEs 115-*a*, 115-*b* appropriately (e.g., via control signaling). For example, base stations 105-*a*, 105-*b* may transmit a cell-specific configuration to UEs 115-*a*, 115-*b* associated with preamble 305, 310 transmissions. The cell-specific configuration may include one or more transmission occasions for transmission of preambles 305, 310. The one or more transmission occasions may be based on time domain resources, frequency domain resources, or both. In some examples, for preamble transmissions to be distinguishable, at least one of the time domain resources or frequency domain resources may be different from resources used for preamble transmissions by other UEs in neighboring cells. For example, as described with reference to FIGS. 3A through 3C, at least one of time and frequency resources may be different, same, or interleaved for transmission of preambles 305, 310.

Accordingly, techniques described herein with reference to FIGS. 3A through 3C may provide efficiency to UEs 115-*a*, 115-*b* by reducing or eliminating latencies associated with processes related to initial channel access, as well as minimizing or eliminating inter-cell interference associated with random access messaging of two-step random access procedures by supporting time division multiplexing, frequency division multiplexing, or time and frequency resource interleaving for preamble transmission, or a combination thereof.

Figure 4:
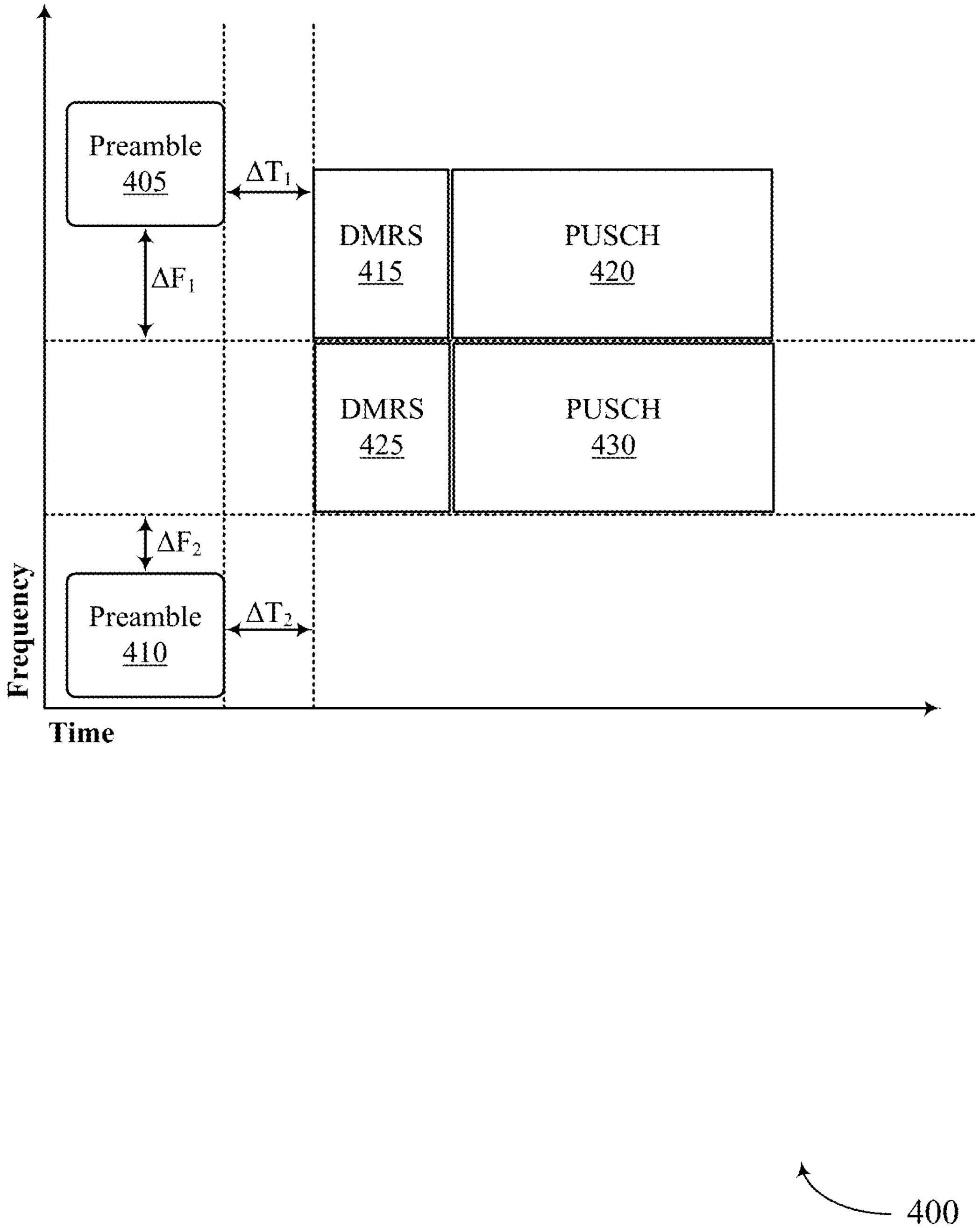
FIG. 4 illustrates an example of a cell-specific configuration of physical uplink shared channel (PUSCH) occasions that support interference management for a two-step random access procedure in accordance with aspects of the present disclosure.

FIG. 4 illustrates an example of a cell-specific configuration 400 of physical uplink shared channel occasions that support interference management for a two-step random access procedure in accordance with aspects of the present disclosure. Cell-specific configuration 400 may implement aspects of wireless communications systems 100 and 200, such as support improvements in interference management of random access messaging for two-step random access procedures. In two-step random access procedures, PUSCH occasions may be defined by time and frequency resources assigned for a random access message payload transmission (e.g., msg A payload transmission). In some examples, the PUSCH occasion may also be associated with a preamble occasion.

A PUSCH occasion (also referred to herein a random access payload transmission) and a preamble occasion may correspond to a temporal period for transmission and/or reception of a preamble and/or payload of a random access message, such as a msg A of a two-step random access procedure. With reference to FIG. 2, UE 115-*a* may be transmitting msg A (e.g., random access message 225-*a*) to base station 105-*a* on a PRACH, while UE 115-*b* may be transmitting msg A (e.g., random access message 225-*b*) to base station 105-*b* on a PRACH. In context of FIG. 4, random access message 225-*a* may include a preamble 405 and a random access payload (e.g., demodulation reference signal (DMRS) 415 and PUSCH 420) that may be transmitted on a PUSCH, and random access message 225-*b* may include a preamble 410 and a random access payload (e.g., DMRS 425 and PUSCH 430) that may also be transmitted on a PUSCH. Because, in some examples, UEs 115-*a*, 115-*b* may be located at a cell edge, UEs 115-*a*, 115-*b* may cause inter-cell interference to each other. To decrease or remove the inter-cell interference, the PUSCH occasion may be defined with respect to the preamble occasion by a time domain offset (e.g., ΔT) or a frequency domain offset (e.g., ΔF), or both. In some examples, time and frequency domain offsets may be different for PRACH associated with preamble 405 and PUSCH associated with the corresponding random access payload (e.g., DMRS 415 and PUSCH 420).

Base stations 105-*a*, 105-*b* may identify a time domain offset (e.g., ΔT) or a frequency domain offset (e.g., ΔF), or both, between a random access preamble and a random access payload. In some examples, at least a time domain offset (e.g., ΔT) or a frequency domain offset (e.g., ΔF) may be different from offsets used for random access payload transmissions by other UEs 115 in neighboring cells. For example, with reference to FIGS. 2 and 4, base station 105-*a* may identify a time domain offset (e.g., $\Delta T_1$) or a frequency domain offset (e.g., $\Delta F_1$), or both, between a random access preamble (e.g., preamble 405) and a random access payload (e.g., DMRS 415 and PUSCH 420). Additionally, or alternatively, with reference to FIGS. 2 and 4, base station 105-*b* may identify a time domain offset (e.g., $\Delta T_2$) or a frequency domain offset (e.g., $\Delta F_2$), or both, between a random access preamble (e.g., preamble 410) and a random access payload (e.g., DMRS 425 and PUSCH 430). To reduce or remove the inter-cell interference the time domain offsets (e.g., $\Delta T_1$ and $\Delta T_2$) or the frequency domain offset (e.g., $\Delta F_1$ and $\Delta F_2$), or both between random access preambles and random access payloads associated with UEs 115-*a*, 115-*b* may be different from each other. By way of example, $\Delta T_1$ may be greater than or lesser than $\Delta T_2$, and $\Delta F_1$ may be greater than or lesser than $\Delta F_2$.

Base stations 105-*a*, 105-*b* may provide an indication (e.g., via control signaling) of a time domain offset (e.g., ΔT) or a frequency domain offset (e.g., ΔF), or both, to UEs 115-*a*, 115-*b*, or configure UEs 115-*a*, 115-*b* with cell-specific configuration that includes the time domain offset (e.g., ΔT) or the frequency domain offset (e.g., ΔF), or both. UEs 115-*a*, 115-*b* may identify the time domain offset (e.g., ΔT) or the frequency domain offset (e.g., ΔF), or both based on the cell-specific configuration. Alternatively, UEs 115-*a*, 115-*b* may identify the time domain offset (e.g., ΔT) or the frequency domain offset (e.g., ΔF), or both based on a cell identifier of cell 110-*a*, 110-*b* in which UEs 115-*a*, 115-*b* belong to (for example, with reference to FIG. 2). As such, UEs 115-*a*, 115-*b* may transmit preambles 405, 410 and random access payload (e.g., DMRS 415, 425 and/or PUSCH 420, 430) appropriately according to the time domain offset (e.g., ΔT) or the frequency domain offset (e.g., ΔF), or both.

In some examples, base stations 105-*a*, 105-*b* (UEs 115-*a*, 115-*b*) may eliminate inter-cell interference by configuring a time domain offset (e.g., ΔT) or a frequency domain offset (e.g., ΔF), or both as a function of a cell identifier, so that resource allocation (e.g., time and frequency resources) for random access payloads (e.g., PUSCH payloads) may be non-overlapping in time and frequency resources. The cell identifier may be specific to cell 110-*a*, 110-*b* of base stations 105-*a*, 105-*b*, for example, with reference to FIG. 2. Base stations 105-*a*, 105-*b* may determine a time domain offset (e.g., ΔT) or a frequency domain offset (e.g., ΔF), or both according to a cell identifier using the following equations:

$$\Delta F = \text{mod}(\text{cell identifier}, M) \tag{1}$$

$$\Delta T = \text{mod}(\text{cell identifier}, N) \tag{2}$$

where mod( ) is the modulo operation, and M and N are constants.

In an effort to randomize inter-cell interference, as well as to attain time and frequency domain diversity, a cell-specific configuration for random access payload (e.g., a PUSCH payload) may include a hopping sequence (e.g., hopping of time and frequency resources assigned to random access payload). Base stations 105-*a*, 105-*b* may identify (or determine) a hopping sequence for reception of a random access payload (e.g., DMRS and/or PUSCH). The hopping sequence may be based on a time domain offset (e.g., ΔT) or a frequency domain offset (e.g., ΔF), or both, between a random access preamble and a random access payload. In some examples, resources used for one or more transmission occasions defined by the hopping sequence may be different from resources used for random access payload transmissions by other UEs in neighboring cells. To implement hopping, time and frequency offsets of PUSCH occasions with respect to preamble occasions may be defined as a function of a subframe index l using the following equations:

$$\Delta F(l) = \text{mod}(\text{cell identifier}, M(l)) \tag{3}$$

$$\Delta T(l) = \text{mod}(\text{cell identifier}, N(l)) \tag{4}$$

where mod( ) is the modulo operation, l denotes the subframe index, M(l) and N(l) are pseudo-random sequences with periodicity L. In some examples, the pseudo-random sequences with periodicity L may be based in part on a cell identifier. Base stations 105-*a*, 105-*b* may provide an indication (e.g., via control signaling) of a hopping sequence, or configure UEs 115-*a*, 115-*b* with cell-specific configuration including the hopping sequence. UEs 115-*a*, 115-*b* may identify the hopping sequence based on the cell-specific configuration. Alternatively, UEs 115-*a*, 115-*b* may identify the hopping sequence using the above equations. As such, UEs 115-*a*, 115-*b* may transmit preambles 405, 410 and random access payload (e.g., DMRS 415, 425 and/or PUSCH 420, 430) appropriately according to the hopping sequence.

In some examples, in an effort to decrease or eliminate inter-cell interference, UEs 115-*a*, 115-*b* may scramble msg A and base stations 105-*a*, 105-*b* may descramble (information bits of) msg A based on a modified RNTI or other UE identifiers such as system architecture evolution (SAE) temporary mobile subscriber identity (S-TMSI). In two-step random access procedures, when UEs 115-*a*, 115-*b* operate in an idle mode (e.g., an RRC idle mode), there may not be a valid C-RNTI that can be used to scramble msg A (e.g., a PUSCH payload). In idle mode, UEs 115-*a*, 115-*b* may scramble msg A based on a modified random access radio network temporary identifier (modified RA-RNTI), which may be based in part on a cell identifier and a set of transmission parameters for msg A. In some examples, a scrambling sequence may be applied to information bits of a random access payload of msg A, the scrambling sequence may be a function of a cell identifier and a UE identifier (e.g., a C-RNTI for when UEs 115-*a*, 115-*b* are in an RRC connected mode, or RRC inactive mode, or modified RNTI for RRC idle mode).

UEs 115-*a*, 115-*b* may determine a modified RA-RNTI according to the following expression:

$$\text{modified } RA-RNTI = XOR(\text{cell identifier}, Z) \quad (5)$$

where Z is defined by the following expression:

$$Z = 1 + s_{id} + 14\times t_{id} + 14\times 80\times f_{id} + 14\times 80\times 8\times ul_{cid} + K\times p_{id} + N\times DMRS_{id} \quad (6)$$

where $s_{id}$ is a symbol index of a modulation symbol associated with a physical random access channel (e.g., $0 \le s_{id} \le 14$), $t_{id}$ is a slot index of a slot associated with the physical random access channel in a frame (e.g., $0 \le t_{id} \le 80$), $f_{id}$ is a frequency domain index associated with the physical random access channel in a frequency domain (e.g., $0 \le f_{id} \le 8$), uplink carrier identifier ($c_{id}$) is a carrier index of an uplink carrier, K is a constant (e.g., 14×80×8×2), $p_{id}$ is a preamble identifier used for msg A (e.g., $0 \le p_{id} \le$ preamble (n)), N is a constant (14×80×8×2×preamble size), and $DMRS_{id}$ is a DMRS port index (e.g., $0 \le DMRS_{id} \le DMRS(n)$) selected by UEs 115-*a*, 115-*b*. Thus, UEs 115-*a*, 115-*b* may determine a modified RA-RNTI based on expressions (5) and (6). For example, UEs 115-*a*, 115-*b* may determine a modified RA-RNTI based on a cell identifier. UEs 115-*a*, 115-*b* may then scramble a random access payload (e.g., DMRS 415, 425 and/or PUSCH 420, 430) based in part on a modified RA-RNTI or other UE identifiers such as C-RNTI, or S-TMSI, or a combination thereof.

In some cases, a modified RA-RNTI may be determined without considering $DMRS_{id}$—e.g., when $DMRS_{id}=0$. In such cases, expression (6) may be re-written to be:

$$Z = 1 + s_{id} + 14\times t_{id} + 14\times 80\times f_{id} + 14\times 80\times 8\times ul_{cid} + K\times p_{id} \quad (7)$$

where $N\times DMRS_{id}$ may not be used to determine a value of Z.

In some examples, when a random access payload is transmitted according to a hopping sequence, UEs 115-*a*, 115-*b* may scramble msg A using different scrambling sequences for different hops. For example, UEs 115-*a*, 115-*b* may use a first scrambling sequence that is generated using a first initialization value (or "scrambling seed") to scramble a msg A transmission during a first hop of the hopping sequence—e.g., the scrambling sequence may be generated as a function of a modified RA-RNTI. And UEs 115-*a*, 115-*b* may use a second scrambling sequence that is generated using a second initialization value to scramble a msg A transmission during a second hop of the hopping sequence. In some examples, the initialization value is based on a redundancy version of the msg A transmission e.g., the scrambling sequence may be generated as a function of a multiple of a redundancy version index and a modified RA-RNTI.

Base stations 105-*a*, 105-*b* may receive the random access payload (e.g., DMRS 415, 425 and/or PUSCH 420, 430) and descramble the random access payload according to a modified RA-RNTI determined using expressions (5) and (6). In addition to when UEs 115-*a*, 115-*b* are in an RRC idle mode, the modified RA-RNTI determined according to expressions (5) and (6) may also be applicable to UEs 115-*a*, 115-*b* when in connected mode (e.g., an RRC connected) or inactive mode (e.g., an RRC inactive), or both. Base stations 105-*a*, 105-*b* may use expression (5) to decode (e.g., descramble information bits of msg A). This may be beneficial to base stations 105-*a*, 105-*b* since it does not need to distinguish between different RRC modes and can use a unified descrambling procedure in msg A decoding.

UEs 115-*a*, 115-*b* may additionally, or alternatively, support alternating pathloss compensation for open-loop power control in an effort to decrease or eliminate inter-cell interference. For example, when open-loop power control is used for msg A transmission in neighboring cells, a pathloss compensation factor (a) assigned to neighboring cells may vary in time. For example, UEs 115-*a*, 115-*b* may determine a transmission power for transmission of msg A (e.g., preambles 405, 410, and payload (e.g., DMRS 415, 425 and PUSCH 420, 430)) for a transmission occasion according to the following equation:

$$P_{f,c}(i) = \min((P_{CMAX,f,x}, P_{0,f,c} + 10\log_{10}(M_{RB,f,c})) + \alpha(i)\cdot PL + \Delta_{f,c}) \quad (8)$$

where $P_{CMAX,f,x}$ denotes a maximum transmission power, $M_{RB,f,c}$ denotes a bandwidth for msg A (e.g., preambles 405, 410, and payload (e.g., DMRS 415, 425 and PUSCH 420, 430)), $P_{o,f,c}$ denotes a target power spectral density (PSD) of power control (PC), $\Delta_{f,c}$ denotes a power offset configured by remaining minimum system information (RMSI), and α(i) denotes a pathloss compensation factor for an i-th transmission occasion of msg A. In some cases, transmission occasions for preamble and payload transmission may have different but correlated configurations in a single cell.

Alternating pathloss compensation for open-loop power control in neighboring cells, for example, for base station 105-*a* α(i) may be 0.9 when i is an odd number and 1.0 when i is an even number, while for base station 105-*b* α(i) may be 1.0 when i is an odd number and 0.9 when i is an even number. Such alternating patterns for pathloss compensation may be preconfigured by a network operator (or base stations 105-*a*, 105-*b*) and indicated in system information to UEs 115-*a*, 115-*b*. Thus, UEs 115-*a*, 115-*b* may determine a transmission power for transmission of msg A based on a pathloss compensation factor determined by equation (8) and transmit msg A based on the determined transmission power. Similarly, base stations 105-*a*, 105-*b* may receive the msg A at a received power that is stronger than a received power of msg A transmitted by other UEs of neighboring cells.

Figure 5:
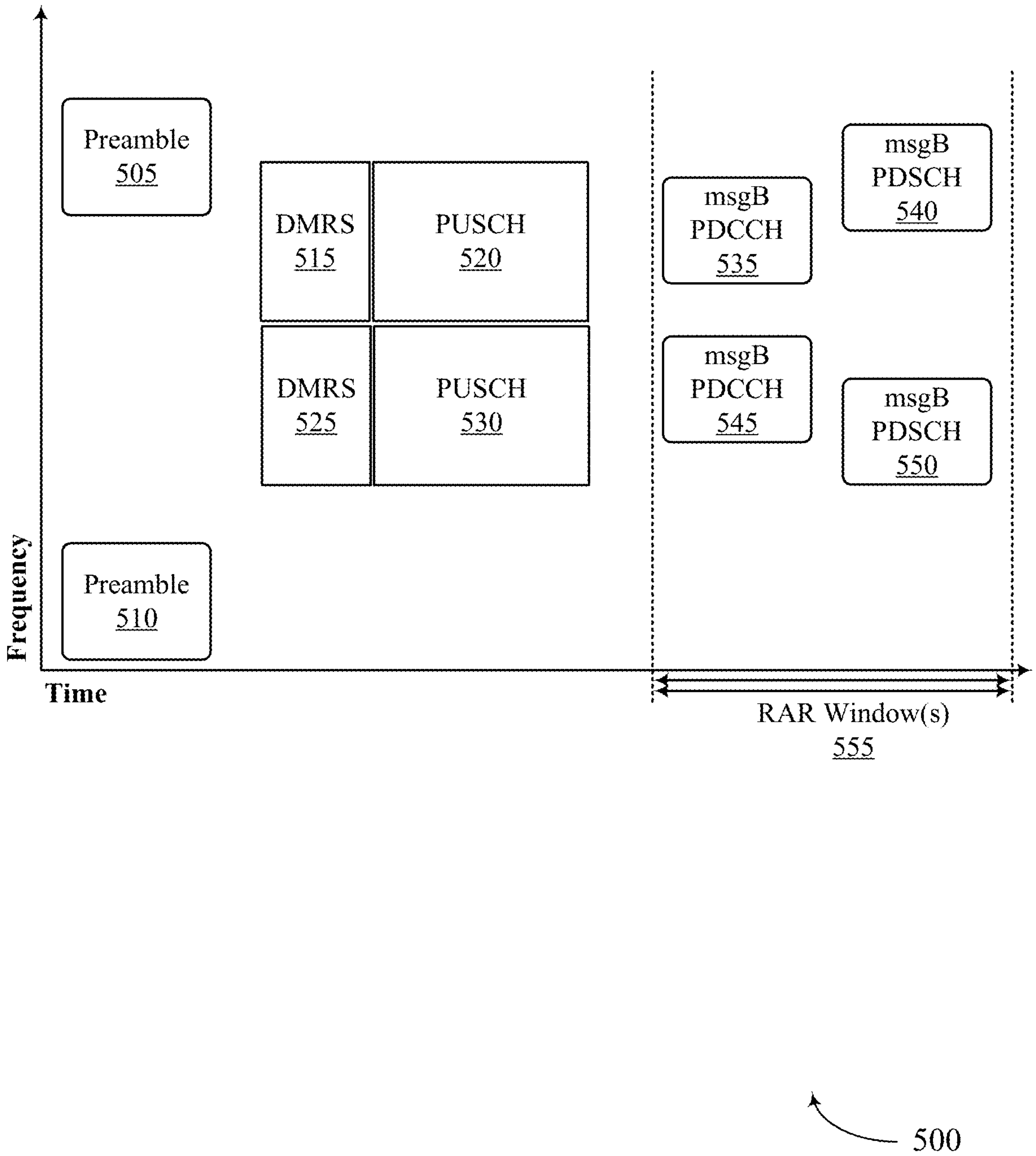
FIG. 5 illustrates an example of a cell-specific configuration of preamble occasions and PUSCH occasions that support interference management for a two-step random access procedure in accordance with aspects of the present disclosure.

FIG. 5 illustrates an example of a cell-specific configuration 500 of preamble occasions and physical uplink shared channel occasions that support interference management for a two-step random access procedure in accordance with aspects of the present disclosure. Cell-specific configuration 500 may implement aspects of wireless communications systems 100 and 200, such as support improvements in interference management of random access messaging for two-step random access procedures.

In two-step random access procedures, PUSCH occasions may be defined by time and frequency resources allocated for random access messaging (e.g., msg A, msg B transmission). The PUSCH occasion may also be associated with a preamble occasion. A PUSCH occasion and a preamble occasion may correspond to a temporal period for transmission and/or reception of random access messages associated with a two-step random access procedure. For example, with reference to FIG. 2, UE 115-*a* may transmit msg A (e.g., random access message 225-*a*) to base station 105-*a*, while UE 115-*b* may transmit msg A (e.g., random access message 225-*b*) to base station 105-*b*. In setting of FIG. 5, random access message 225-*a* may include a preamble 505 and a payload (e.g., DMRS 515 and PUSCH 520), and random access message 225-*b* may include a preamble 510 and a payload (e.g., DMRS 525 and PUSCH 530). In response to msg A, base station 105-*a* may transmit msg B (e.g., random access response message 230-*a*) to UE 115-*a*, while base station 105-*b* may transmit msg B (e.g., random access response message 230-*b*) to UE 115-*b* simultaneously. In FIG. 5, random access response message 230-*a* may include a msg B PDCCH 535 and a msg B PDSCH 540, and random access response message 230-*b* may include a msg B PDCCH 545 and a msg B PDSCH 550. A downlink control information of the msg B PDCCH may carry downlink assignment information for PDSCH. The PDSCH may carry a random access response and a contention resolution message for msg A.

In some examples, when PUSCH occasions of a current cell and neighboring cells are within a threshold period from each other, the corresponding random access response windows may overlap in time domain. For example, random access response windows 555 associated with base stations 105-*a*, 105-*b* may overlap in time. Because, in some examples, UEs 115-*a*, 115-*b* may be located at a cell edge, UEs 115-*a*, 115-*b* may cause inter-cell interference to each other. As a result, msg A detection may be affected by inter-cell interference. Additionally, when two-step random access procedures are ongoing in neighboring cells that also have similar transmission occasions, detection of msg B may too suffer from inter-cell interference. Thus, UEs 115-*a*, 115-*b* may suffer from inter-cell interference in monitoring and decoding msg B (e.g., msg B PDCCH 535, 545 and msg B PDSCH 540, 550).

To remove the inter-cell interference and improve reliability of decoding msg B, base stations 105-*a*, 105-*b* may configure a search space or coreset(s) (e.g., including one or more control channel elements) for transmission of random access messages related to two-step random access channel procedures. A search space may refer to a number of coresets, where each search space may include multiple coresets containing multiple control channel elements. For example, a coreset may span multiple resource blocks in the frequency domain and may span a number of OFDM symbols in the time domain. In some examples, base stations 105-*a*, 105-*b* may configure a search space for transmission of one or more control channel elements during a random access response window 555. The one or more control channel elements may be orthogonal in frequency to one or more control channel elements of a second search space associated with random access messages transmitted by other base stations in neighboring cells. In some examples, some control channel elements may partially overlap in frequency domain with one or more control channel elements associated with random access messages transmitted by other base stations in neighboring cells.

Base stations 105-*a*, 105-*b* may transmit downlink control information via msg B PDCCH 535, 545 to UEs 115-*a*, 115-*b*. In some examples, UEs 115-*a*, 115-*b* may be configured to monitor for msg B PDCCH 535, 545 within a search space, which may include multiple search candidates. UEs 115-*a*, 115-*b* may be configured to monitor one or more search candidates in the search space and may blindly decode the one or more control channel elements of the search candidate to receive the control information. UEs 115-*a*, 115-*b* may detect and decode the control information within the search space candidates. For example, base station 105-*a*, 105-*b* may transmit the random access response messages 230-*a*, 230-*b* (e.g., msg B PDCCH 535, 545 and/or msg B PDSCH 540, 550) on one or more coresets within a search space. UEs 115-*a*, 115-*b* may monitor one or more search candidates in the one or more coresets within the search space. UEs 115-*a*, 115-*b* may detect and decode the random access response message 230-*a*, 230-*b* on at least one of the coresets. In some examples, base stations 105-*a*, 105-*b* may scramble a cyclic redundancy check associated with control information for msg B (e.g., msg B PDCCH 535, 545) based on a RA-RNTI or a modified RA-RNTI, or both. UEs 115-*a*, 115-*b* may descramble the cyclic redundancy check associated with control information for msg B (e.g., msg B PDCCH 535, 545) based on a RA-RNTI, or a modified RA-RNTI, or both as described with reference to FIG. 4. Once UEs 115-*a*, 115-*b* receive the random access response message 230-*a*, 230-*b*, UEs 115-*a*, 115-*b* may handle the connection procedure (e.g., two-step random access procedure) appropriately.

Techniques described herein with reference to FIG. 5 may provide efficiency to UEs 115-*a*, 115-*b* by reducing or eliminating latencies associated with processes related to initial channel access, as well as minimizing or eliminating inter-cell interference associated with random access messaging of two-step random access procedures by supporting time division multiplexing, frequency division multiplexing, or time and frequency resource interleaving for preamble transmission, or a combination thereof.

Figure 6:
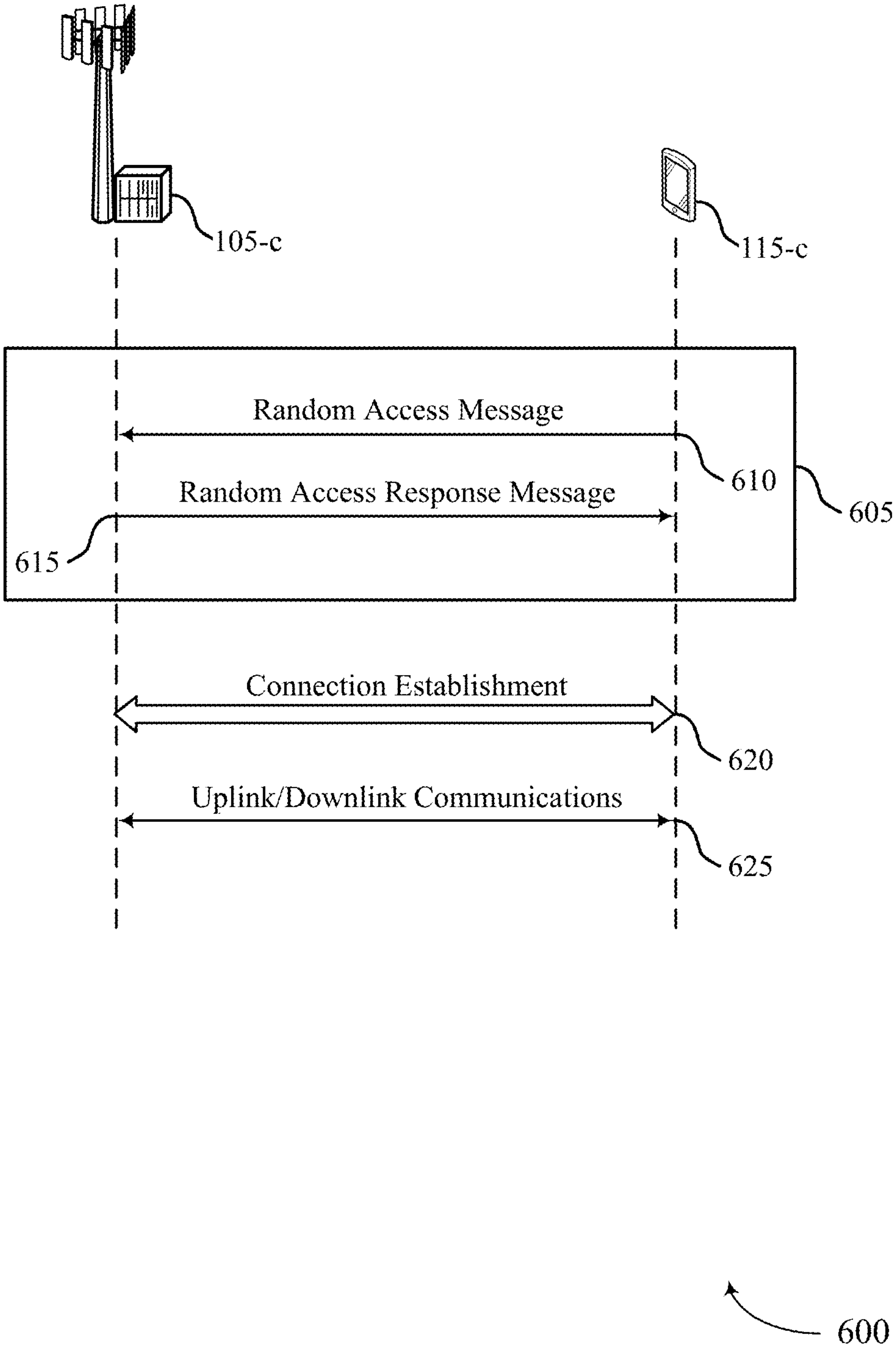
FIG. 6 illustrates an example of a process flow that supports interference management for a two-step random access procedure in accordance with aspects of the present disclosure.

FIG. 6 illustrates an example of a process flow 600 that supports interference management for a two-step random access procedure in accordance with aspects of the present disclosure. The process flow 600 may implement aspects of wireless communications systems 100 and 200, such as providing improvements in random access messaging and inter-cell interference avoidance. The process flow 600 may include a base station 105-*c* and a UE 115-*c*, which may be examples of the corresponding devices described with reference to FIG. 1. In the following description of the process flow 600, the operations between the base station 105-*c* and the UE 115-*c* may be transmitted in a different order than the exemplary order shown, or the operations performed by the base station 105-*c* and the UE 115-*c* may be performed in different orders or at different times. Certain operations may also be omitted from the process flow 600, and/or other operations may be added to the process flow 600.

At 605, the process flow 600 may commence with the base station 105-*c* and the UE 115-*c* performing a random access procedure to establish a connection. The base station 105-*c* and the UE 115-*c* may support multiple radio access technologies including 4G systems such as LTE systems, LTE-A systems, or LTE-A Pro systems, and 5G systems which may be referred to as NR systems. The random access procedure may correspond to, for example, at least one of the above example radio access technologies. In FIG. 6, by way of example, the random access procedure may be a two-step random access procedure related to 5G NR systems, or the like.

At 610, the UE 115-*c* may transmit a random access message (also referred to as msg A) to the base station 105-*c*, as part of the random access procedure. When the random access procedure is a two-step random access channel (RACH) procedure, msg A transmitted from the UE 115-*c* may include a preamble and a payload (e.g. an RRC connection request). For example, as part of the random access procedure, the UE 115-*c* may transmit the msg A using a preamble. In some examples, the msg A may be transmitted based on or more cell-specific transmission parameters or cell-specific transmission schemes. At 615, the base station 105-*c* may transmit a random access response message (also referred to as msg B) to the UE 115-*c*, as part of the random access procedure. The msg B may be a random access response to the received random access message (e.g. msg A) from the UE 115-*c*. In some examples, the base station 105-*c* may transmit the msg B to the UE 115-*c* based in part on or more cell-specific transmission parameters or cell-specific transmission schemes.

At 620, the process flow 600 may proceed with the base station 105-*c* and the UE 115-*c* establishing the connection. At 625, the process flow 600 may proceed with the base station 105-*c* and the UE 115-*c* communicating uplink and downlink communications (e.g., control information, data, and the like). The operations performed by the base station 105-*c* and the UE 115-*c* as part of, but not limited to, process flow 600 may provide improvements in random access messaging, and more specifically inter-cell interference avoidance. The operations performed by the base station 105-*c* and the UE 115-*c* as part of, but not limited to, process flow 600 may also provide efficiency to the UE 115-*c* by reducing latency associated with processes related to initial channel access (e.g., minimize delay due to contention-based protocol (e.g., listen-before-talk)), and more specifically to establish a connection with the base station 105-*c*.

Figure 7:
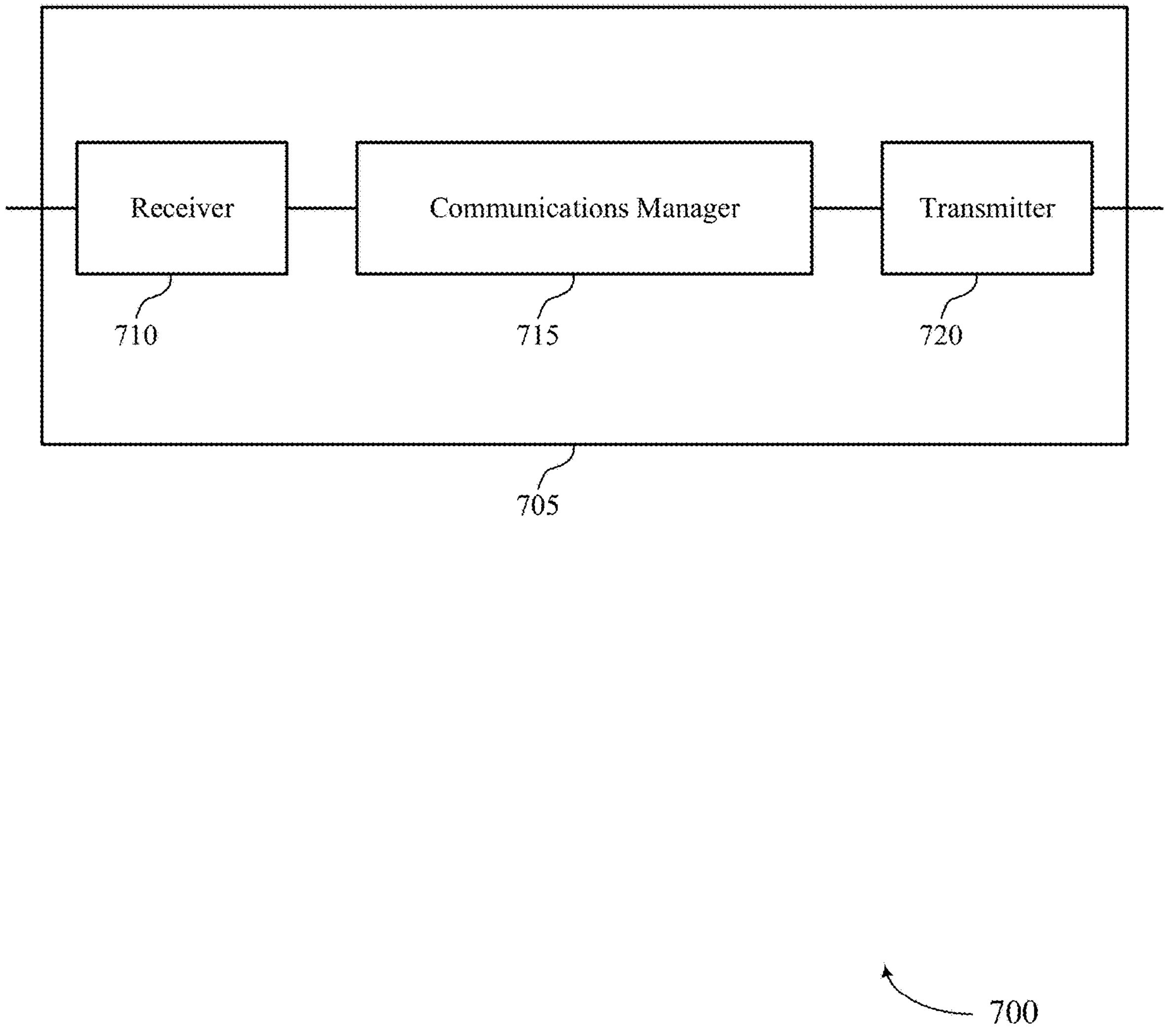
FIGS. 7 and 8 show block diagrams of devices that support interference management for two-step random access in accordance with aspects of the present disclosure.

FIG. 7 shows a block diagram 700 of a device 705 that supports interference management for two-step random access in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, random access channels, and information related to interference management for two-step random access, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit, to a base station serving a cell, a first random access message of a two-step random access procedure, the first random access message including a random access preamble and a random access payload, at least one of the random access preamble or the random access payload being transmitted based on one or more cell-specific transmission parameters or cell-specific transmission schemes, receive, from the base station, a second random access response message of the two-step random access procedure in response to the first random access message, and establish a connection with the base station based on the first random access message and the second random access response message. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital system processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
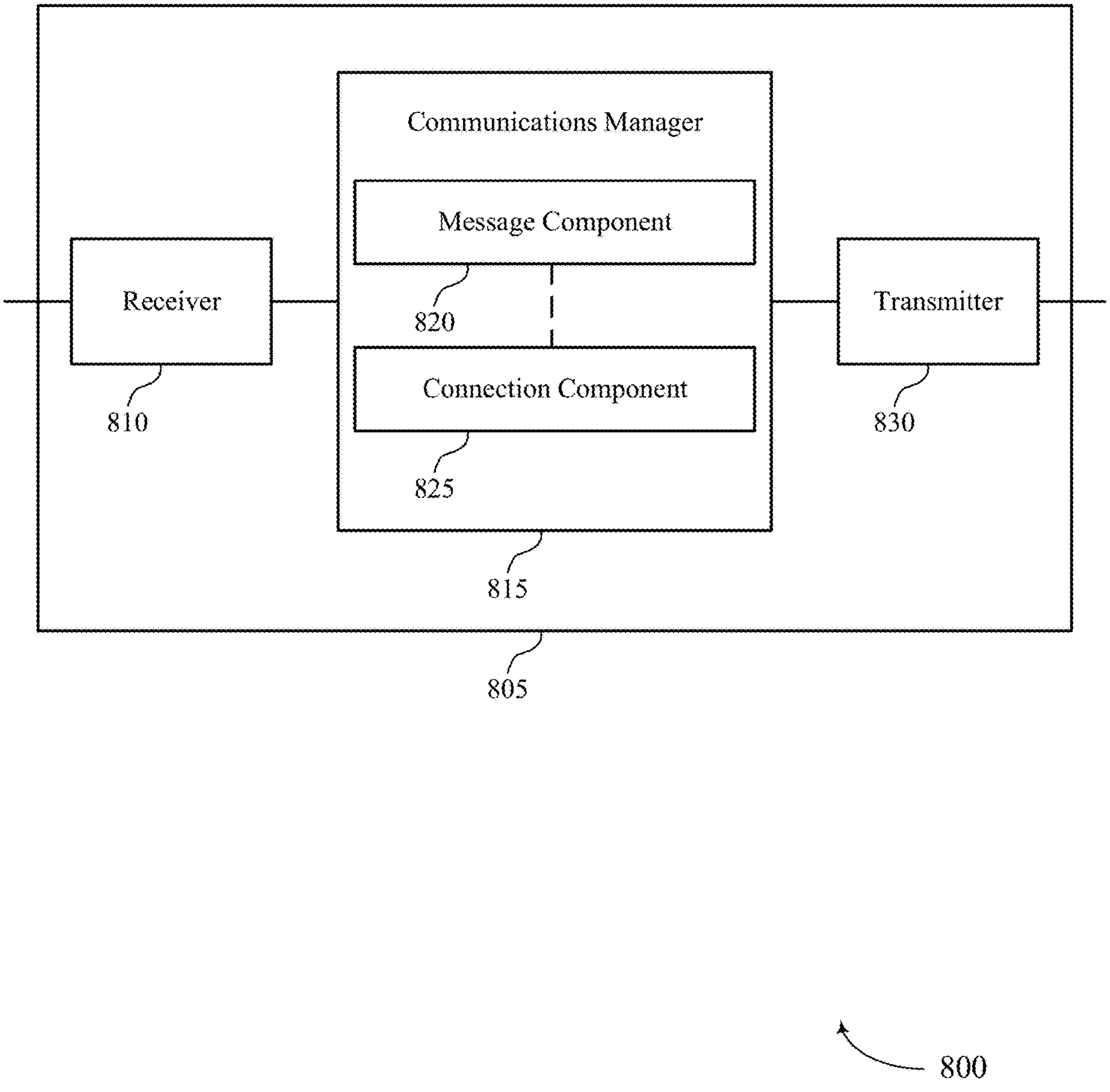

FIG. 8 shows a block diagram 800 of a device 805 that supports interference management for two-step random access in accordance with aspects of the present disclosure. The device 805 may be an example of aspects of a device 705, or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to interference management for two-step random access, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a message component 820 and a connection component 825. The communications manager 815 may be an example of aspects of the communications manager 1010 described herein. The message component 820 may transmit, to a base station serving the cell, a first random access message of a two-step random access procedure, the first random access message including a random access preamble and a random access payload, at least one of the random access preamble or the random access payload being transmitted based on one or more cell-specific transmission parameters or cell-specific transmission schemes and receive, from the base station, a second random access response message of the two-step random access procedure in response to the first random access message. The connection component 825 may establish a connection with the base station based on the first random access message and the second random access response message.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
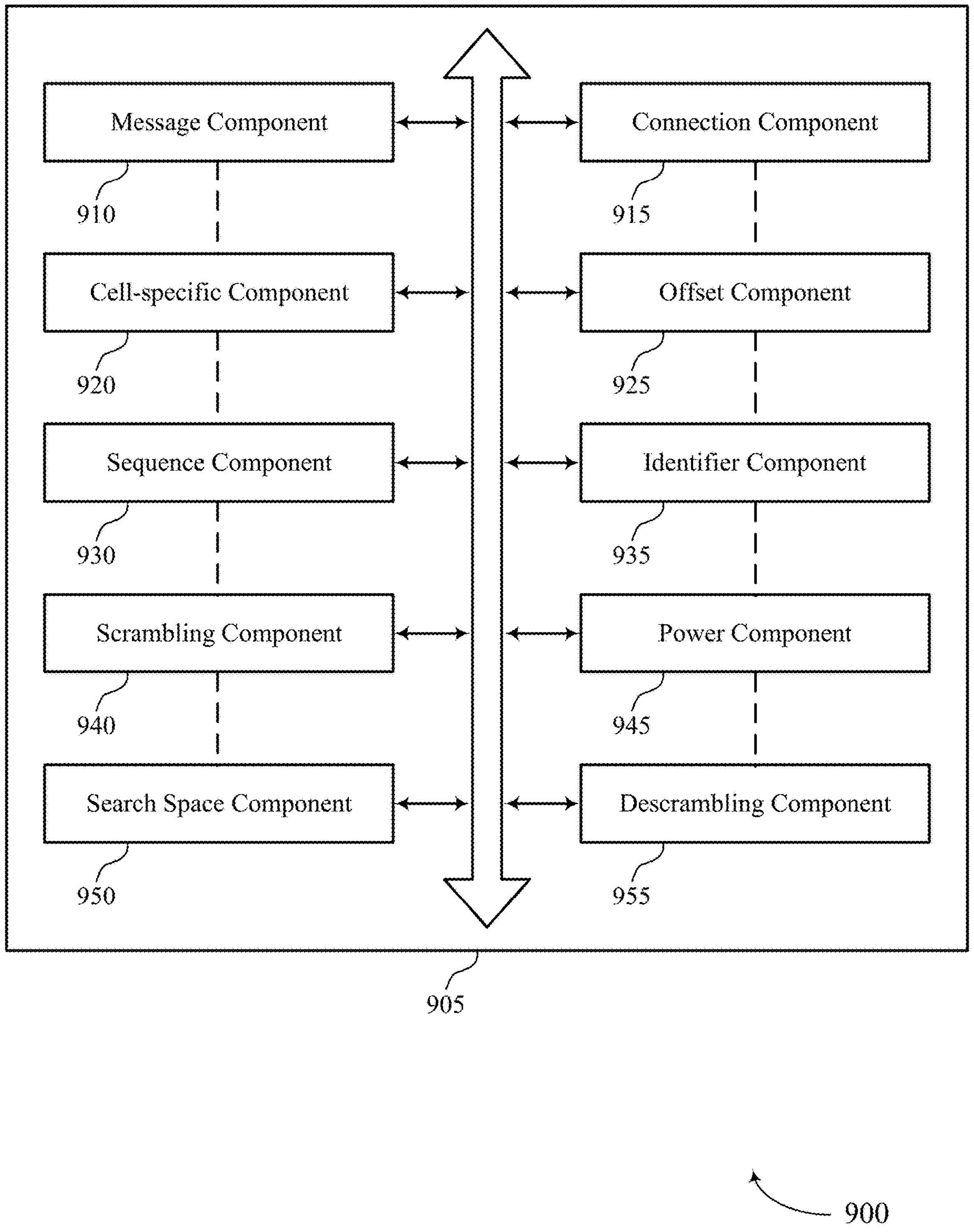
FIG. 9 shows a block diagram of a communications manager that supports interference management for two-step random access in accordance with aspects of the present disclosure.

FIG. 9 shows a block diagram 900 of a communications manager 905 that supports interference management for two-step random access in accordance with aspects of the present disclosure. The communications manager 905 may be an example of aspects of a communications manager 715, a communications manager 815, or a communications manager 1010 described herein. The communications manager 905 may include a message component 910, a connection component 915, a cell-specific component 920, an offset component 925, a sequence component 930, an identifier component 935, a scrambling component 940, a power component 945, a search space component 950, and a descrambling component 955. Each of these modules may communicate, directly or indirectly, with one another (e.g., via one or more buses).

The message component 910 may transmit, to a base station serving a cell, a first random access message of a two-step random access procedure, the first random access message including a random access preamble and a random access payload, at least one of the random access preamble or the random access payload being transmitted based on one or more cell-specific transmission parameters or cell-specific transmission schemes. In some examples, the message component 910 may receive, from the base station, a second random access response message of the two-step random access procedure in response to the first random access message. In some examples, the message component 910 may transmit the random access preamble during one or more transmission occasions. In some examples, the message component 910 may transmit the random access payload during a PUSCH occasion based at least in part on the time domain offset or the frequency domain offset, or both. In some examples, the message component 910 may transmit the random access payload during a PUSCH occasion based at least in part on a hopping sequence. In some examples, the message component 910 may transmit scrambled bits of a random access payload after channel coding. The connection component 915 may establish a connection with the base station based on the first random access message and the second random access response message.

The cell-specific component 920 may receive a cell-specific configuration for transmission of the random access preamble. In some examples, the cell-specific component 920 may identify, from the cell-specific configuration, one or more random access preamble transmission occasions, where the one or more random access preamble transmission occasions include time domain resources, frequency domain resources, or both, at least one of the time domain resources or frequency domain resources being the one or more cell-specific transmission parameters. In some examples, the cell-specific component 920 may receive a cell-specific configuration that includes the time domain offset, the frequency domain offset, or both.

The offset component 925 may identify a time domain offset or a frequency domain offset, or both, between the one or more random access preamble transmission occasions and a corresponding random access payload transmission occasion, where the one or more cell-specific transmission parameters includes at least one of the time domain offset or the frequency domain offset. In some examples, the offset component 925 may determine the time domain offset or the frequency domain offset, or both, based on a cell identifier of the cell. In some examples, the offset component 925 may determine the time domain offset or the frequency domain offset, or both, based on a cell identifier of the cell and one or more pseudo-random sequences. In some cases, the generation of at least one of the pseudo-random sequences is based on the cell identifier.

The sequence component 930 may identify a hopping sequence for transmission of the random access payload, where the hopping sequence is based on a time domain offset or a frequency domain offset, or both, between the random access preamble and the random access payload, where the one or more cell-specific transmission parameters include the time and frequency resources used for one or more transmission occasions defined by the hopping sequence. In some examples, the sequence component 930 may receive a cell-specific configuration for the hopping sequence. In some examples, the sequence component 930 may scramble, for a first hop of the hopping sequence, information bits of the random access payload based at least in part on a first scrambling sequence that is a function of a first initialization value. In some examples, the sequence component 930 may scramble, for a second hop of the hopping sequence, information bits of a second random access payload based at least in part on a second scrambling sequence that is a function of a second initialization value. In some examples, the sequence component 930 may transmit the random access payload on the PUSCH in a second random access payload transmission occasion based at least in part on the hopping sequence. The identifier component 935 may determine a modified RA-RNTI based on a cell identifier.

The scrambling component 940 may scramble the random access payload based on the modified RA-RNTI or other UE identifiers, where a scrambling sequence applied to information bits of the random access payload is a function of the cell identifier and ac UE identifier. In some examples, the scrambling component 940 may scramble the information bits of random access payload based on a random access preamble identifier. In some examples, the scrambling component 940 may scramble the information bits of random access payload based on the port index of a demodulation reference signal. In some examples, the modified RA-RNTI is used for a radio resource control idle mode, a radio resource control inactive mode, and a radio resource connected mode.

The power component 945 may determine a transmission power for transmission of the first random access message based on a pathloss compensation factor, where the one or more cell-specific transmission parameters include the pathloss compensation factor and the pathloss compensation factor is different from neighboring cell pathloss compensation factors used by other UEs in neighboring cells during same transmission occasions. In some cases, the pathloss compensation factor is based on a value of a transmission occasion of the first random access message.

The search space component 950 may monitor a search space for one or more control channel elements during a random access response window, where the one or more control channel elements are orthogonal in frequency to one or more control channel elements of a second search space associated with other UEs of neighboring cells. The descrambling component 955 may descramble a cyclic redundancy check associated with control information for the second random access response message based on a modified RA-RNTI.

Figure 10:
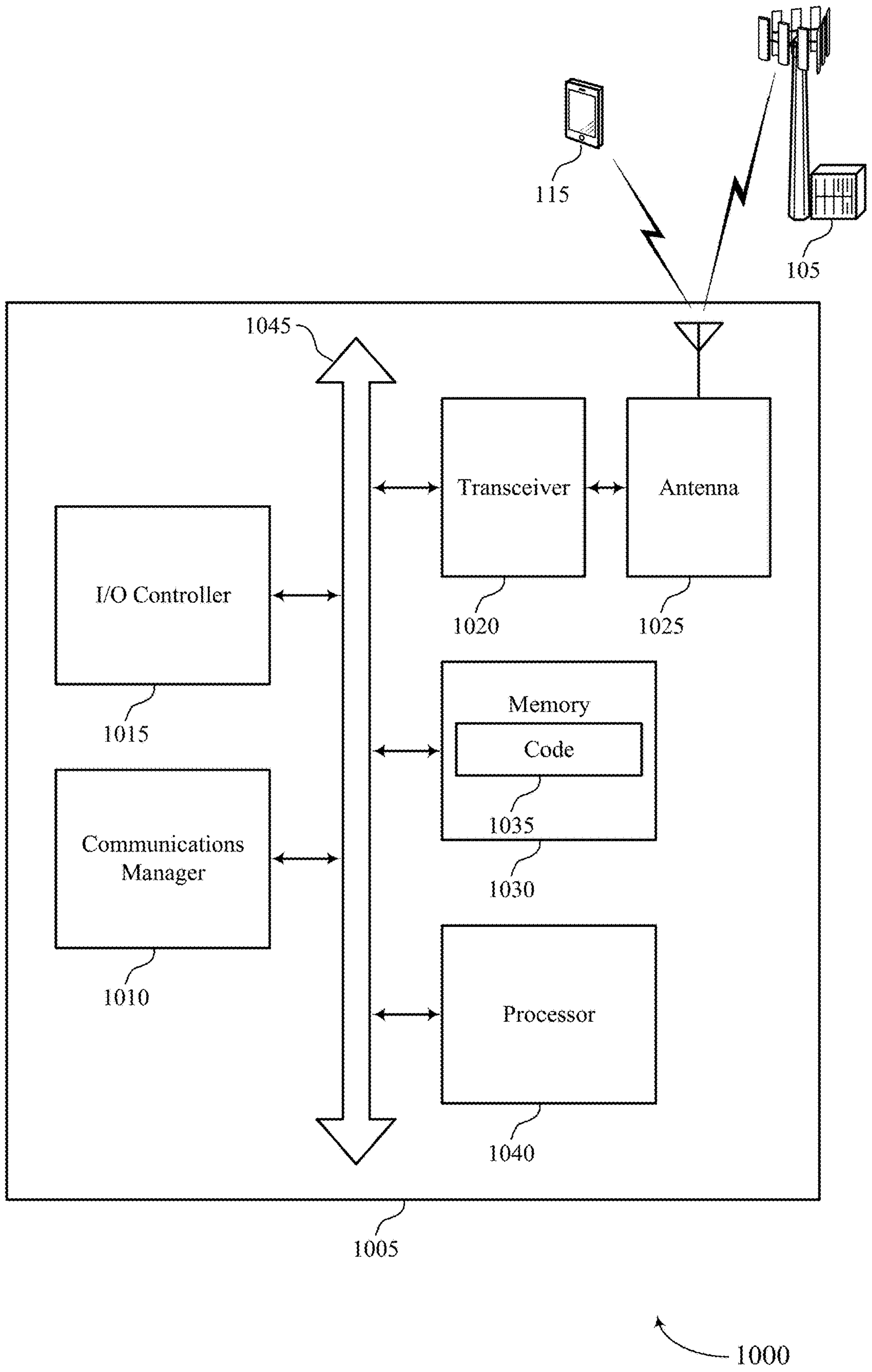
FIG. 10 shows a diagram of a system including a device that supports interference management for two-step random access in accordance with aspects of the present disclosure.

FIG. 10 shows a diagram of a system 1000 including a device 1005 that supports interference management for two-step random access in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit, to a base station serving a cell, a first random access message of a two-step random access procedure, the first random access message including a random access preamble and a random access payload, at least one of the random access preamble or the random access payload being transmitted based on one or more cell-specific transmission parameters or cell-specific transmission schemes, receive, from the base station, a second random access response message of the two-step random access procedure in response to the first random access message, and establish a connection with the base station based on the first random access message and the second random access response message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as IOS, ANDROID, MS-DOS, MS-WINDOWS, OS/2, UNIX, LINUX, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting interference management for two-step random access).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
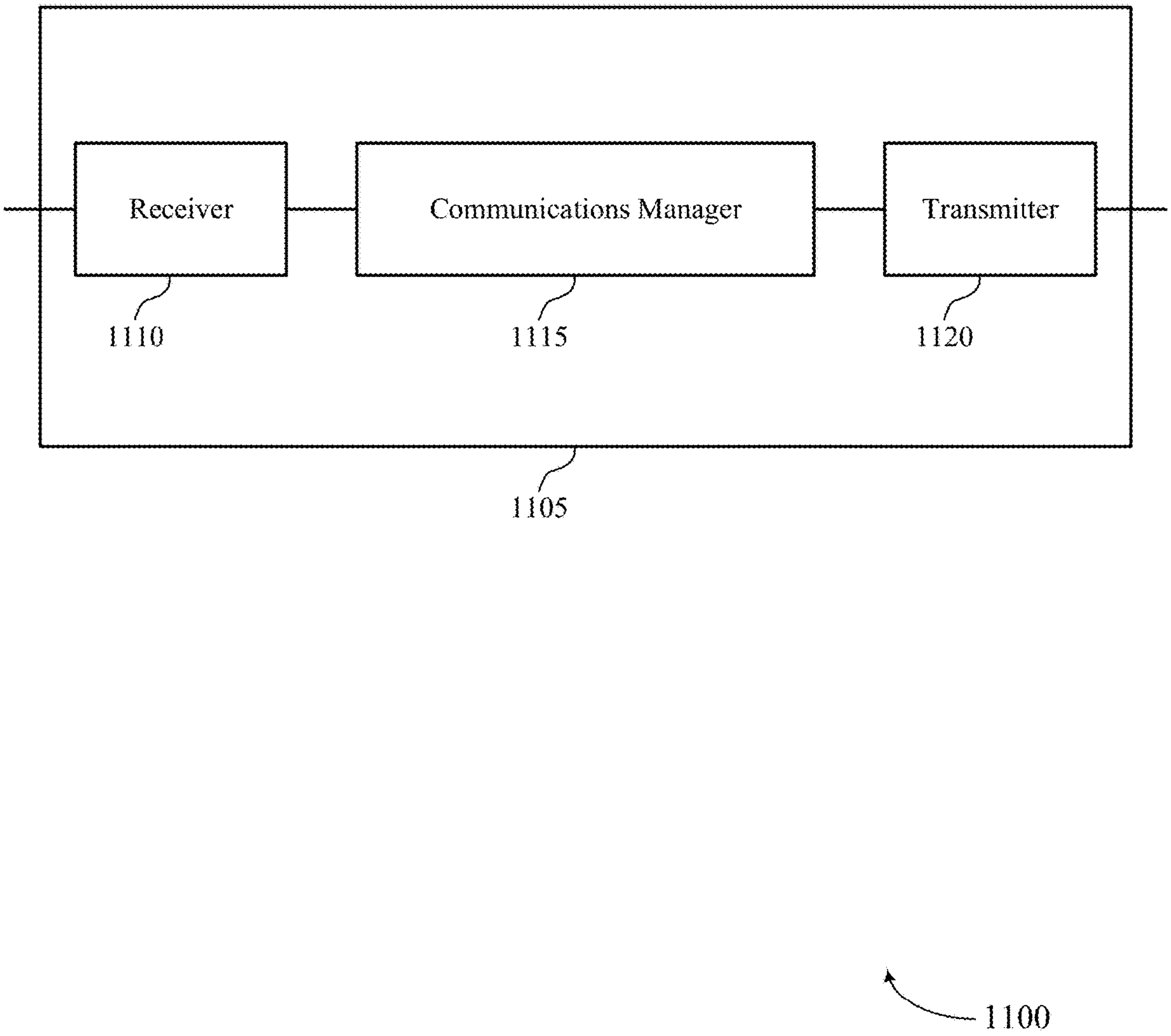
FIGS. 11 and 12 show block diagrams of devices that support interference management for two-step random access in accordance with aspects of the present disclosure.

FIG. 11 shows a block diagram 1100 of a device 1105 that supports interference management for two-step random access in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to interference management for two-step random access, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE served by the cell, a first random access message of a two-step random access channel procedure, transmit, to the UE, a second random access response message of the two-step random access channel procedure in response to the first random access message, the second random access response message being transmitted based on one or more cell-specific transmission parameters or cell-specific transmission schemes, and establish a connection with the UE based on the first random access message and the second random access response message. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
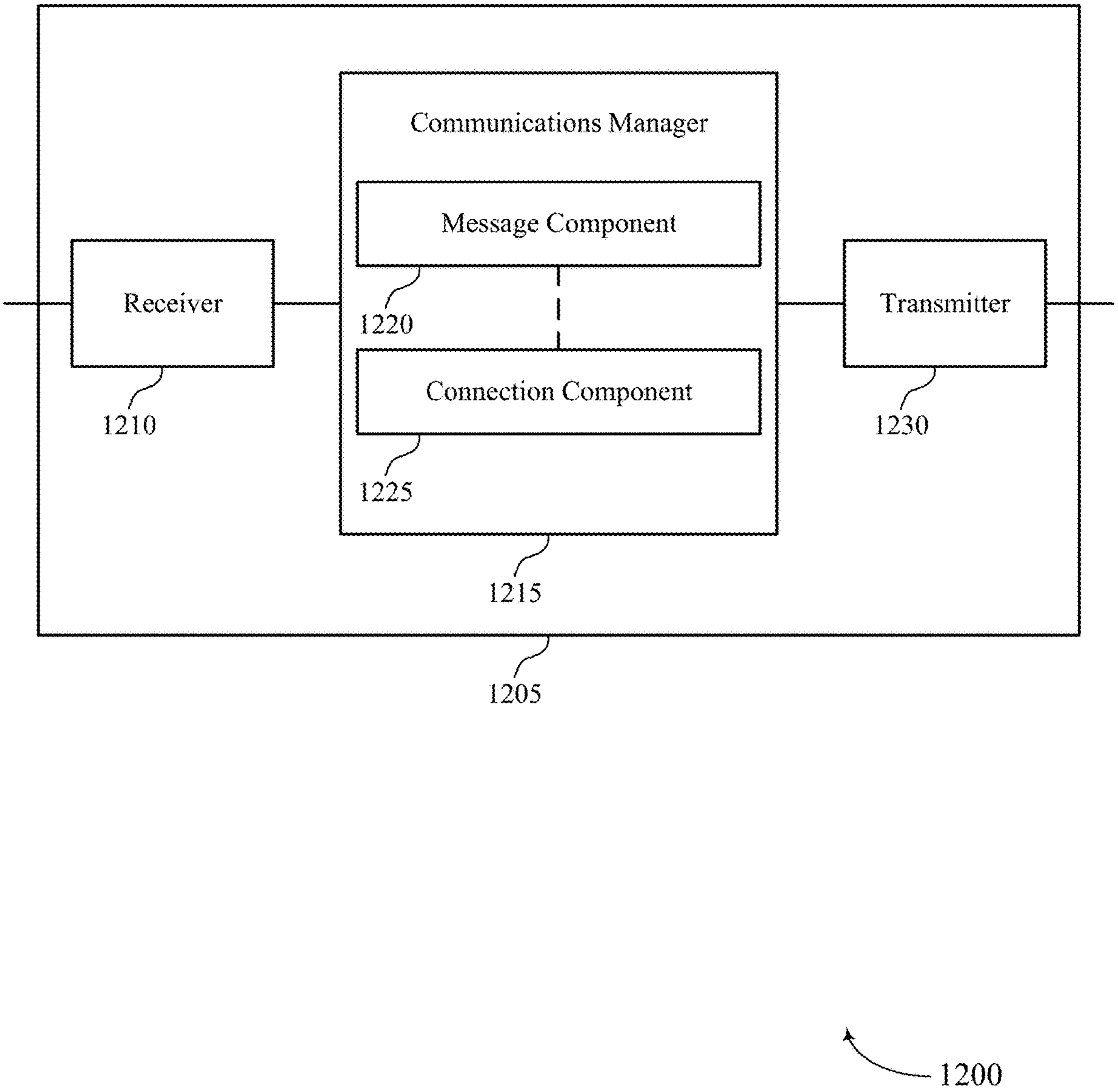

FIG. 12 shows a block diagram 1200 of a device 1205 that supports interference management for two-step random access in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to interference management for two-step random access, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a message component 1220 and a connection component 1225. The communications manager 1215 may be an example of aspects of the communications manager 1410 described herein.

The message component 1220 may receive, from a UE served by the cell, a first random access message of a two-step random access channel procedure and transmit, to the UE, a second random access response message of the two-step random access channel procedure in response to the first random access message, the second random access response message being transmitted based on one or more cell-specific transmission parameters or cell-specific transmission schemes. The connection component 1225 may establish a connection with the UE based on the first random access message and the second random access response message.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
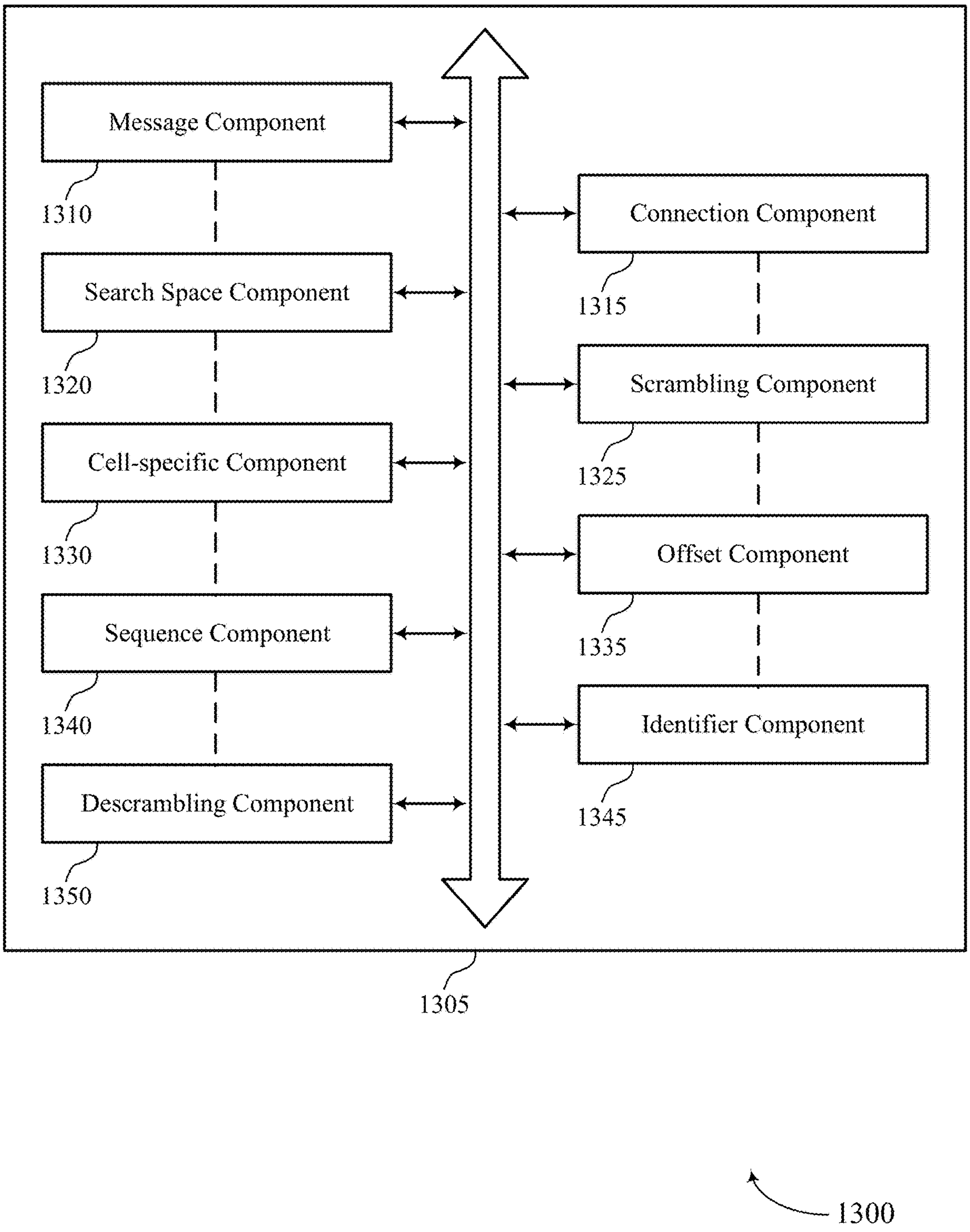
FIG. 13 shows a block diagram of a communications manager that supports interference management for two-step random access in accordance with aspects of the present disclosure.

FIG. 13 shows a block diagram 1300 of a communications manager 1305 that supports interference management for two-step random access in accordance with aspects of the present disclosure. The communications manager 1305 may be an example of aspects of a communications manager 1115, a communications manager 1215, or a communications manager 1410 described herein. The communications manager 1305 may include a message component 1310, a connection component 1315, a search space component 1320, a scrambling component 1325, a cell-specific component 1330, an offset component 1335, a sequence component 1340, an identifier component 1345, and a descrambling component 1350. Each of these modules may communicate, directly or indirectly, with one another (e.g., via one or more buses).

The message component 1310 may receive, from a UE served by the cell, a first random access message of a two-step random access channel procedure. In some examples, the message component 1310 may transmit, to the UE, a second random access response message of the two-step random access channel procedure in response to the first random access message, the second random access response message being transmitted based on one or more cell-specific transmission parameters or cell-specific transmission schemes. In some examples, the message component 1310 may receive a random access preamble and a random access payload, at least one of the random access preamble or the random access payload being received based on one or more cell-specific transmission parameters or cell-specific transmission schemes that are different from random access transmission parameters or schemes used by other UEs in the neighboring cells. In some examples, the message component 1310 may receive the random access preamble on a PRACH during one or more random access preamble transmission occasions.

In some examples, the message component 1310 may receive the random access payload during a physical uplink shared channel occasion based at least in part on the time domain offset or the frequency domain offset, or both. In some examples, the message component 1310 may receive the random access payload during a physical uplink shared channel occasion based at least in part on the hopping sequence. In some examples, the message component 1310 may receive he descrambled information bits of random access payload. In some examples, the message component 1310 may receive the first random access message at a received power that is stronger than the interference from the random access messages transmitted by other UEs of neighboring cells. The connection component 1315 may establish a connection with the UE based on the first random access message and the second random access response message.

The search space component 1320 may configure a search space for transmission of one or more control channel elements during a random access response window, where the one or more control channel elements are the one or more cell-specific transmission parameters and are orthogonal in frequency to one or more control channel elements of a second search space associated with the random access messages transmitted by other base stations in the neighboring cells.

The scrambling component 1325 may scramble a cyclic redundancy check associated with control information for the second random access response message based on a modified RA-RNTI. In some examples, the modified RA-RNTI may be based on the cell identifier and the scrambled cyclic redundancy check may be the one or more cell-specific transmission schemes.

The cell-specific component 1330 may transmit a cell-specific configuration to the UE for transmission of the random access preamble, where the cell-specific configuration includes one or more transmission occasions for transmission of the random access preamble, where the one or more transmission occasions are based on time domain resources, frequency domain resources, or both, at least one of the time domain resources or frequency domain resources being different from resources used for random access preamble transmissions by other UEs in neighboring cells. In some cases, the cell-specific component 1330 may transmit, to the UE, a first set of parameters for transmitting the first random access message, wherein the first set of parameters comprise power control parameters, cell-specific transmission parameters, cell specific transmission schemes, or any combination thereof.

The offset component 1335 may identify a time domain offset or a frequency domain offset, or both, between the random access preamble and the random access payload, where at least one of the time domain offset or the frequency domain offset is different from offsets used for random access payload transmissions by other UEs in neighboring cells. In some examples, the offset component 1335 may determine the time domain offset or the frequency domain offset, or both, based on a cell identifier of the cell. In some examples, the offset component 1335 may determine the time domain offset or the frequency domain offset, or both, based on a cell identifier of the cell and one or more pseudo-random sequences. In some cases, the generation for at least one of the pseudo-random sequences is based on the cell identifier.

The sequence component 1340 may identify a hopping sequence for reception of the random access payload, where the hopping sequence is based on a time domain offset or a frequency domain offset, or both, between the random access preamble and the random access payload, where resources used for one or more transmission occasions defined by the hopping sequence are different from resources used for random access payload transmissions by other UEs in neighboring cells. The identifier component 1345 may determine a modified RA-RNTI based on a cell identifier of the cell. The descrambling component 1350 may descramble the information bits of random access payload based on the modified RA-RNTI. In some examples, the descrambling component 1350 may descramble the information bits random access payload based on a random access preamble identifier. In some examples, the descrambling component 1350 may descramble the random access payload based on a port index of demodulation reference signal.

Figure 14:
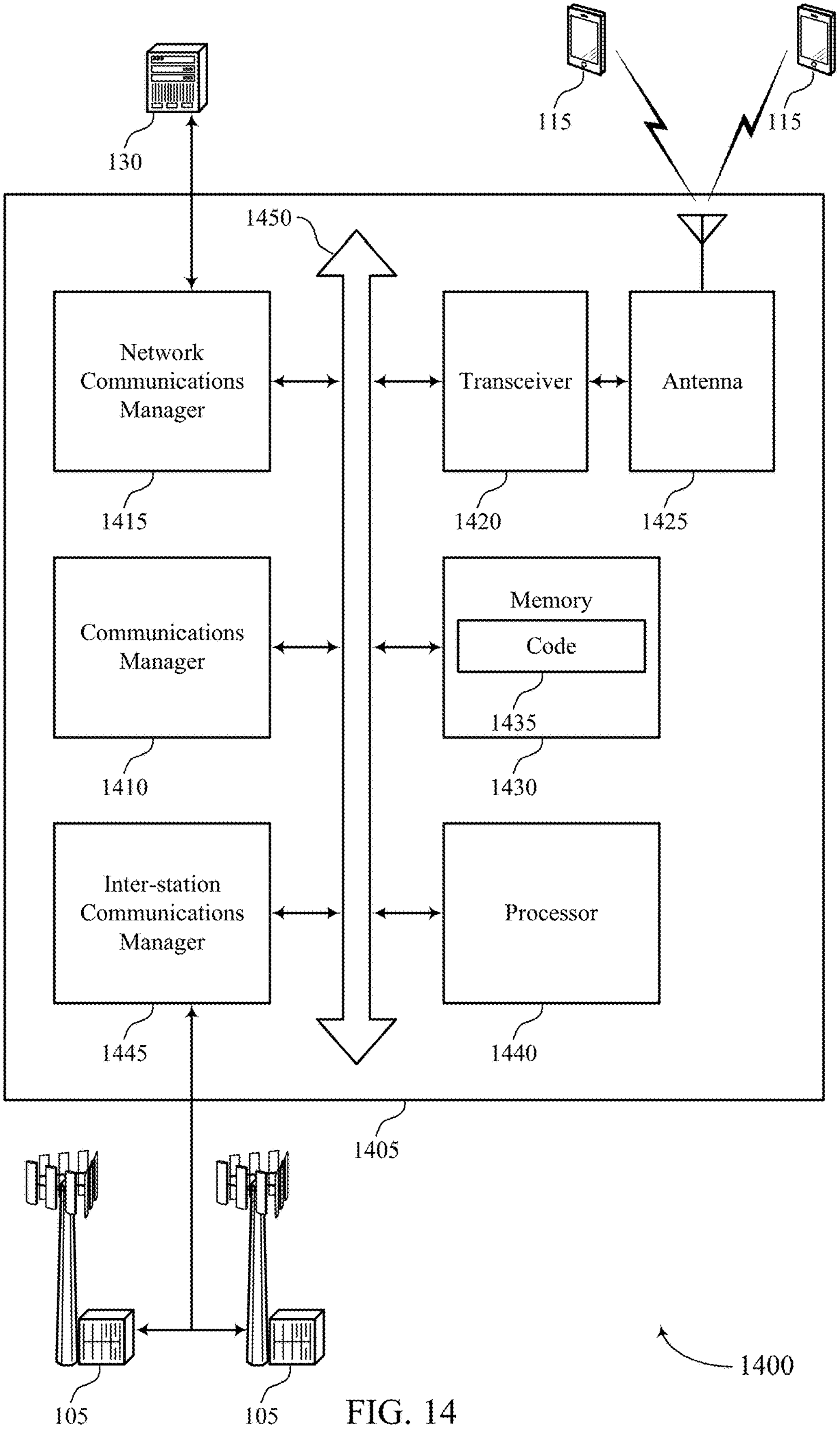
FIG. 14 shows a diagram of a system including a device that supports interference management for two-step random access in accordance with aspects of the present disclosure.

FIG. 14 shows a diagram of a system 1400 including a device 1405 that supports interference management for two-step random access in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE served by the cell, a first random access message of a two-step random access channel procedure, transmit, to the UE, a second random access response message of the two-step random access channel procedure in response to the first random access message, the second random access response message being transmitted based on one or more cell-specific transmission parameters or cell-specific transmission schemes, and establish a connection with the UE based on the first random access message and the second random access response message.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting interference management for two-step random access).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
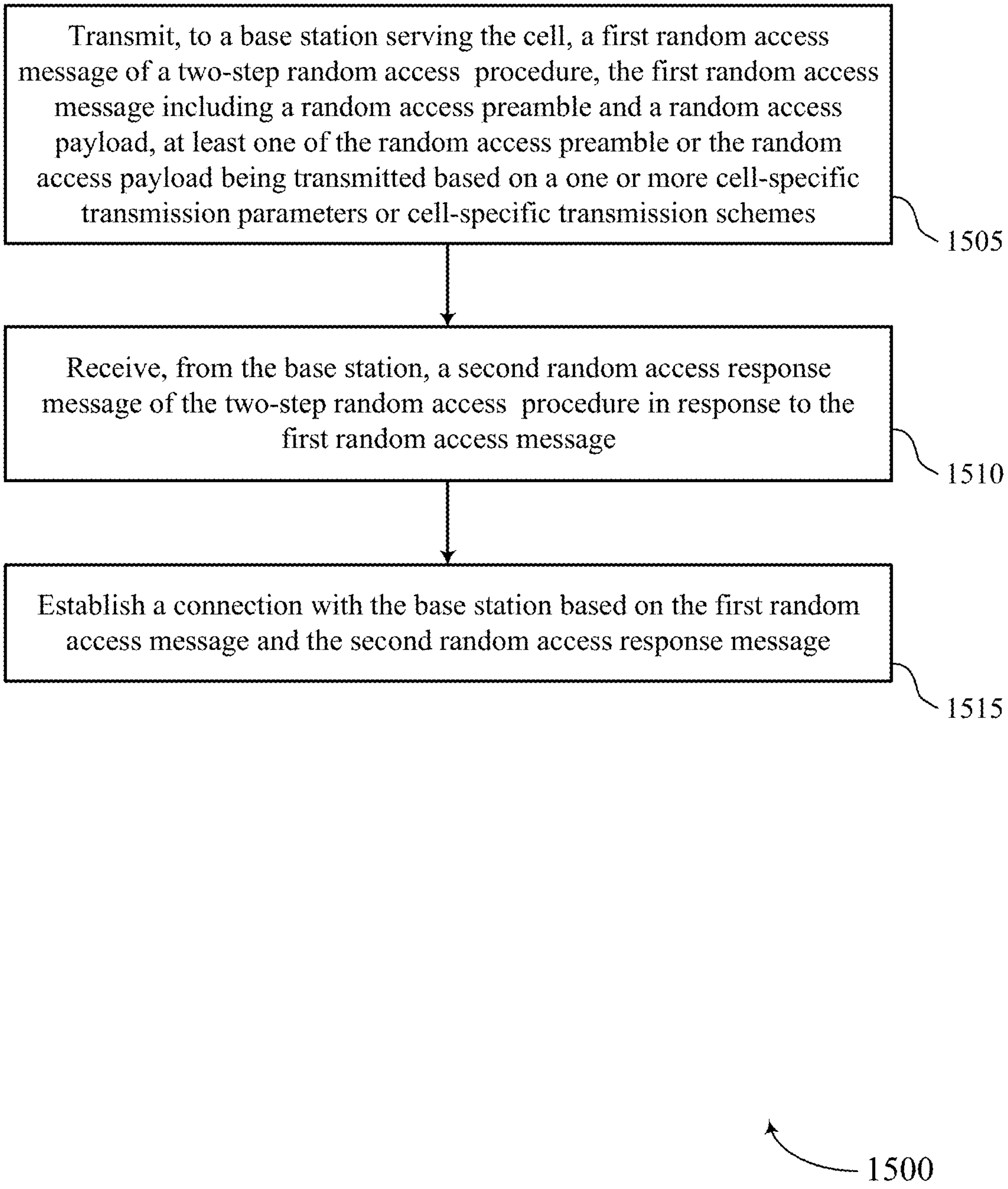
FIGS. 15 through 22 show flowcharts illustrating methods that support interference management for two-step random access in accordance with aspects of the present disclosure.

FIG. 15 shows a flowchart illustrating a method 1500 that supports interference management for two-step random access in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may transmit, to a base station serving the cell, a first random access message of a two-step random access procedure, the first random access message including a random access preamble and a random access payload, at least one of the random access preamble or the random access payload being transmitted based on one or more cell-specific transmission parameters or cell-specific transmission schemes. The operations of 1505 may be performed according to the methods described herein. In some examples, aspects of the operations of 1505 may be performed by a message component as described with reference to FIGS. 7 through 10.

At 1510, the UE may receive, from the base station, a second random access response message of the two-step random access procedure in response to the first random access message. The operations of 1510 may be performed according to the methods described herein. In some examples, aspects of the operations of 1510 may be performed by a message component as described with reference to FIGS. 7 through 10.

At 1515, the UE may establish a connection with the base station based on the first random access message and the second random access response message. The operations of 1515 may be performed according to the methods described herein. In some examples, aspects of the operations of 1515 may be performed by a connection component as described with reference to FIGS. 7 through 10.

Figure 16:
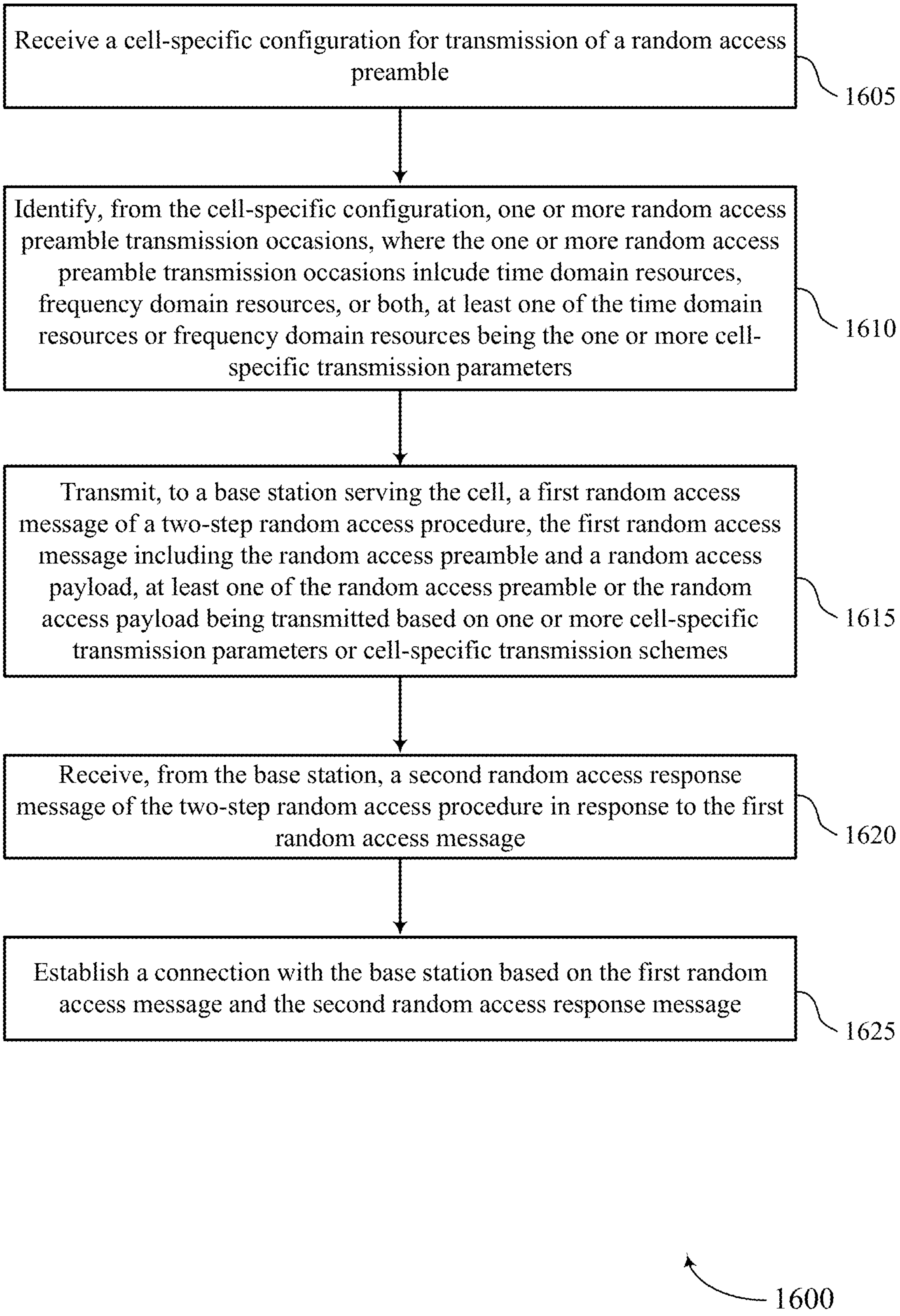

FIG. 16 shows a flowchart illustrating a method 1600 that supports interference management for two-step random access in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may receive a cell-specific configuration for transmission of a random access preamble. The operations of 1605 may be performed according to the methods described herein. In some examples, aspects of the operations of 1605 may be performed by a cell-specific component as described with reference to FIGS. 7 through 10.

At 1610, the UE may identify, from the cell-specific configuration, one or more random access preamble transmission occasions, where the one or more random access preamble transmission occasions include time domain resources, frequency domain resources, or both, at least one of the time domain resources or frequency domain resources being the one or more cell-specific transmission parameters. The operations of 1610 may be performed according to the methods described herein. In some examples, aspects of the operations of 1610 may be performed by a cell-specific component as described with reference to FIGS. 7 through 10.

At 1615, the UE may transmit, to a base station serving the cell, a first random access message of a two-step random access procedure, the first random access message including the random access preamble and a random access payload, at least one of the random access preamble or the random access payload being transmitted based on one or more cell-specific transmission parameters or cell-specific transmission schemes. The operations of 1615 may be performed according to the methods described herein. In some examples, aspects of the operations of 1615 may be performed by a message component as described with reference to FIGS. 7 through 10.

At 1620, the UE may receive, from the base station, a second random access response message of the two-step random access procedure in response to the first random access message. The operations of 1620 may be performed according to the methods described herein. In some examples, aspects of the operations of 1620 may be performed by a message component as described with reference to FIGS. 7 through 10.

At 1625, the UE may establish a connection with the base station based on the first random access message and the second random access response message. The operations of 1625 may be performed according to the methods described herein. In some examples, aspects of the operations of 1625 may be performed by a connection component as described with reference to FIGS. 7 through 10.

Figure 17:
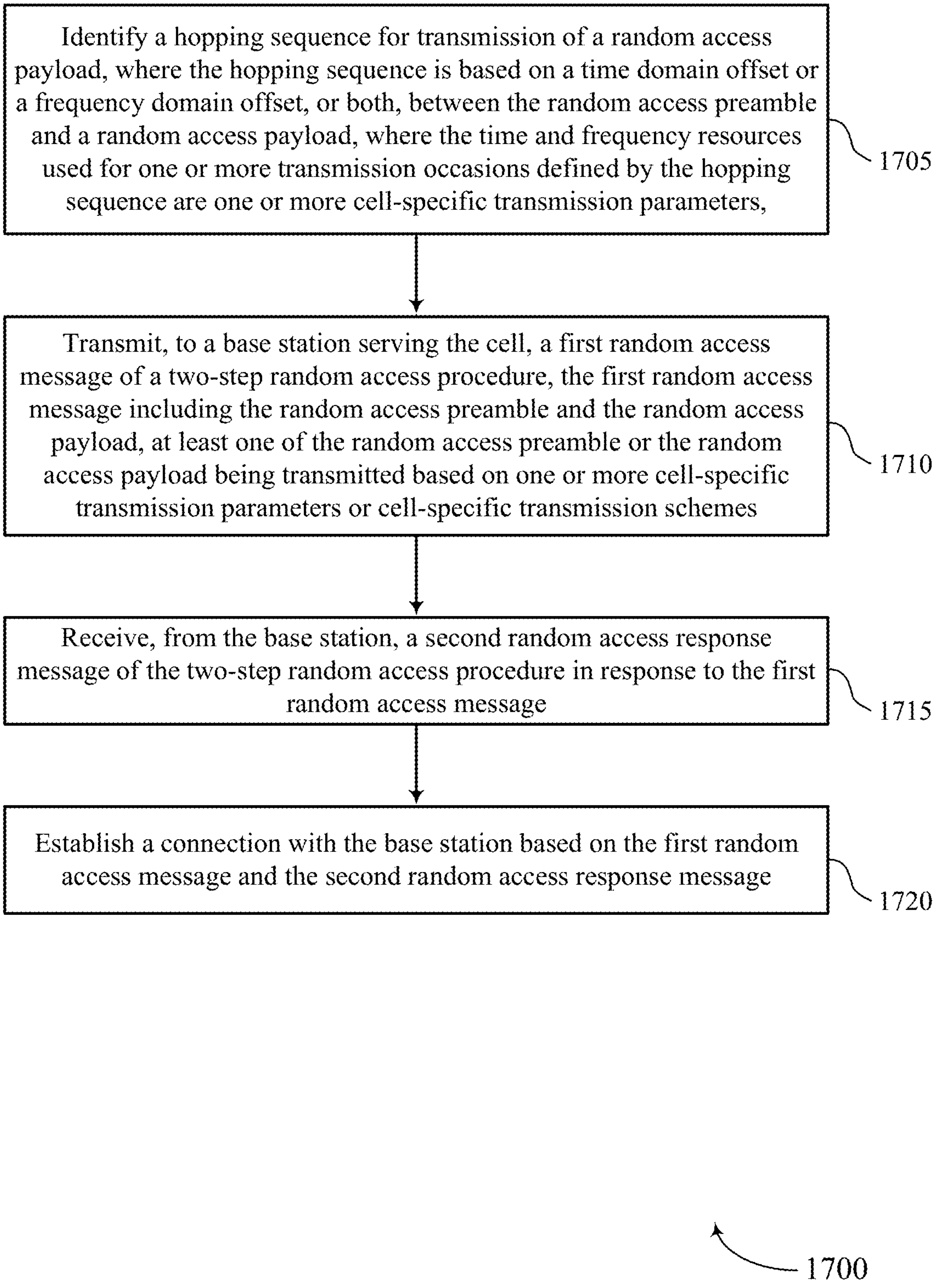

FIG. 17 shows a flowchart illustrating a method 1700 that supports interference management for two-step random access in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may identify a hopping sequence for transmission of a random access payload, where the hopping sequence is based on a time domain offset or a frequency domain offset, or both, between the random access preamble and a random access payload, where the time and frequency resources used for one or more transmission occasions defined by the hopping sequence are one or more cell-specific transmission parameters. The operations of 1705 may be performed according to the methods described herein. In some examples, aspects of the operations of 1705 may be performed by a sequence component as described with reference to FIGS. 7 through 10.

At 1710, the UE may transmit, to a base station serving the cell, a first random access message of a two-step random access procedure, the first random access message including the random access preamble and the random access payload, at least one of the random access preamble or the random access payload being transmitted based on one or more cell-specific transmission parameters or cell-specific transmission schemes. The operations of 1710 may be performed according to the methods described herein. In some examples, aspects of the operations of 1710 may be performed by a message component as described with reference to FIGS. 7 through 10.

At 1715, the UE may receive, from the base station, a second random access response message of the two-step random access procedure in response to the first random access message. The operations of 1715 may be performed according to the methods described herein. In some examples, aspects of the operations of 1715 may be performed by a message component as described with reference to FIGS. 7 through 10.

At 1720, the UE may establish a connection with the base station based on the first random access message and the second random access response message. The operations of 1720 may be performed according to the methods described herein. In some examples, aspects of the operations of 1720 may be performed by a connection component as described with reference to FIGS. 7 through 10.

Figure 18:
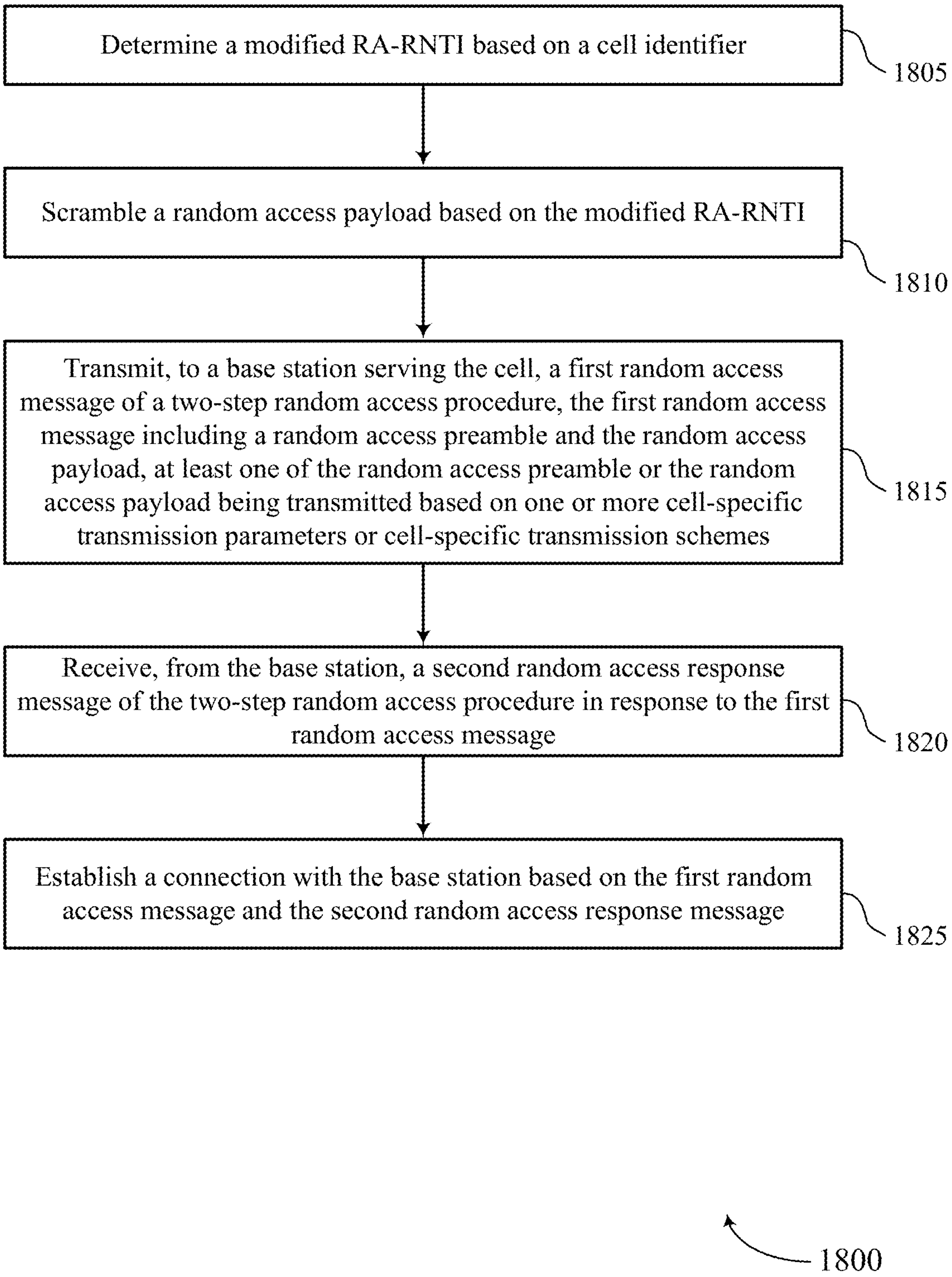

FIG. 18 shows a flowchart illustrating a method 1800 that supports interference management for two-step random access in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may determine a modified RA-RNTI based on a cell identifier. The operations of 1805 may be performed according to the methods described herein. In some examples, aspects of the operations of 1805 may be performed by an identifier component as described with reference to FIGS. 7 through 10.

At 1810, the UE may scramble a random access payload based on the modified RA-RNTI (or other UE identifiers). The operations of 1810 may be performed according to the methods described herein. In some examples, aspects of the operations of 1810 may be performed by a scrambling component as described with reference to FIGS. 7 through 10.

At 1815, the UE may transmit, to a base station serving the cell, a first random access message of a two-step random access procedure, the first random access message including a random access preamble and the random access payload, at least one of the random access preamble or the random access payload being transmitted based on one or more cell-specific transmission parameters or cell-specific transmission schemes. The operations of 1815 may be performed according to the methods described herein. In some examples, aspects of the operations of 1815 may be performed by a message component as described with reference to FIGS. 7 through 10.

At 1820, the UE may receive, from the base station, a second random access response message of the two-step random access procedure in response to the first random access message. The operations of 1820 may be performed according to the methods described herein. In some examples, aspects of the operations of 1820 may be performed by a message component as described with reference to FIGS. 7 through 10.

At 1825, the UE may establish a connection with the base station based on the first random access message and the second random access response message. The operations of 1825 may be performed according to the methods described herein. In some examples, aspects of the operations of 1825 may be performed by a connection component as described with reference to FIGS. 7 through 10.

Figure 19:
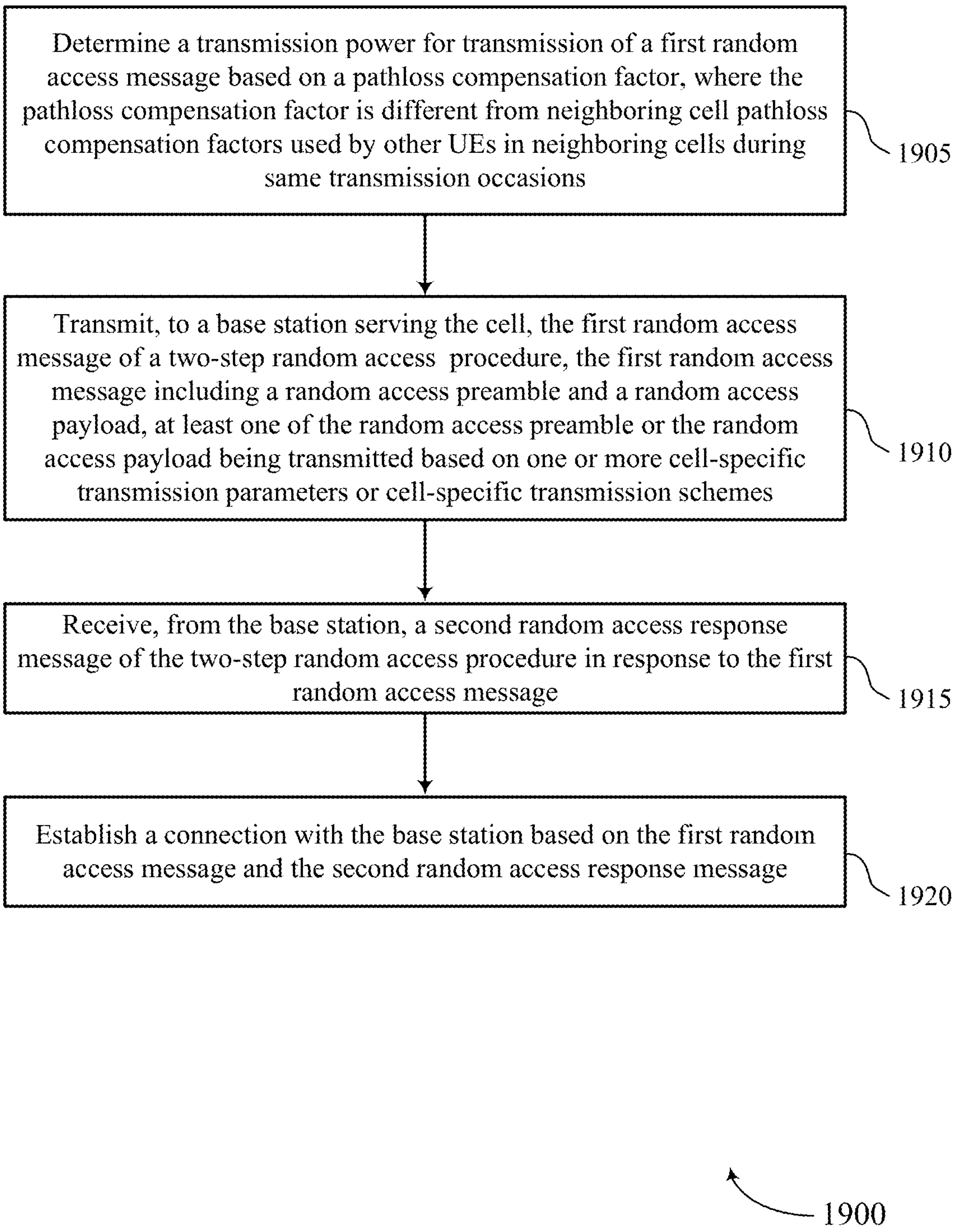

FIG. 19 shows a flowchart illustrating a method 1900 that supports interference management for two-step random access in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1905, the UE may determine a transmission power for transmission of a first random access message based on a pathloss compensation factor, where the pathloss compensation factor is different from neighboring cell pathloss compensation factors used by other UEs in neighboring cells during same transmission occasions. The operations of 1905 may be performed according to the methods described herein. In some examples, aspects of the operations of 1905 may be performed by a power component as described with reference to FIGS. 7 through 10.

At 1910, the UE may transmit, to a base station serving the cell, a first random access message of a two-step random access procedure, the first random access message including a random access preamble and a random access payload, at least one of the random access preamble or the random access payload being transmitted based on one or more cell-specific transmission parameters or cell-specific transmission schemes. The operations of 1910 may be performed according to the methods described herein. In some examples, aspects of the operations of 1910 may be performed by a message component as described with reference to FIGS. 7 through 10.

At 1915, the UE may receive, from the base station, a second random access response message of the two-step random access procedure in response to the first random access message. The operations of 1915 may be performed according to the methods described herein. In some examples, aspects of the operations of 1915 may be performed by a message component as described with reference to FIGS. 7 through 10.

At 1920, the UE may establish a connection with the base station based on the first random access message and the second random access response message. The operations of 1920 may be performed according to the methods described herein. In some examples, aspects of the operations of 1920 may be performed by a connection component as described with reference to FIGS. 7 through 10.

Figure 20:
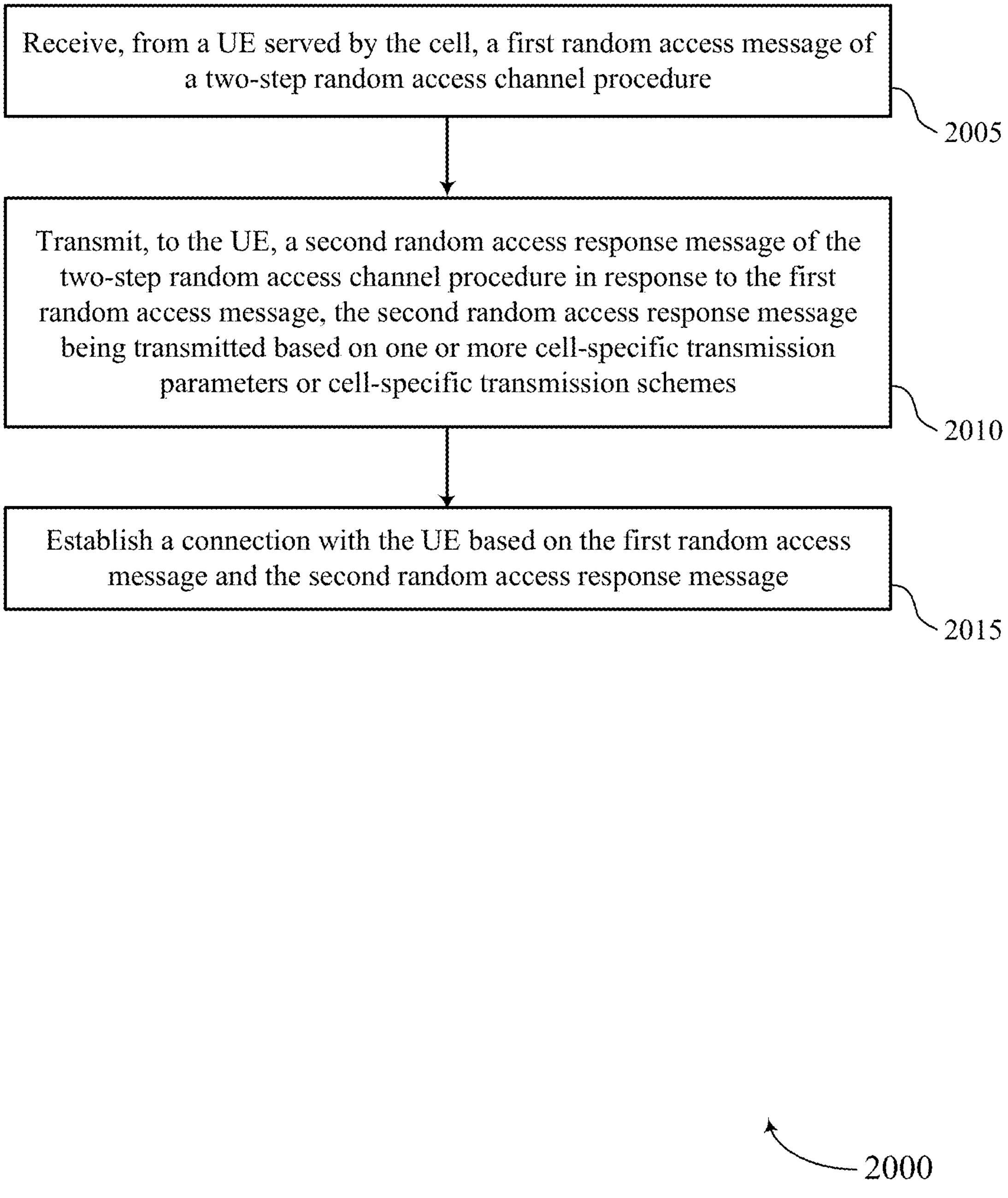

FIG. 20 shows a flowchart illustrating a method 2000 that supports interference management for two-step random access in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2005, the base station may receive, from a UE served by the cell, a first random access message of a two-step random access channel procedure. The operations of 2005 may be performed according to the methods described herein. In some examples, aspects of the operations of 2005 may be performed by a message component as described with reference to FIGS. 11 through 14.

At 2010, the base station may transmit, to the UE, a second random access response message of the two-step random access channel procedure in response to the first random access message, the second random access response message being transmitted based on one or more cell-specific transmission parameters or cell-specific transmission schemes. The operations of 2010 may be performed according to the methods described herein. In some examples, aspects of the operations of 2010 may be performed by a message component as described with reference to FIGS. 11 through 14.

At 2015, the base station may establish a connection with the UE based on the first random access message and the second random access response message. The operations of 2015 may be performed according to the methods described herein. In some examples, aspects of the operations of 2015 may be performed by a connection component as described with reference to FIGS. 11 through 14.

Figure 21:
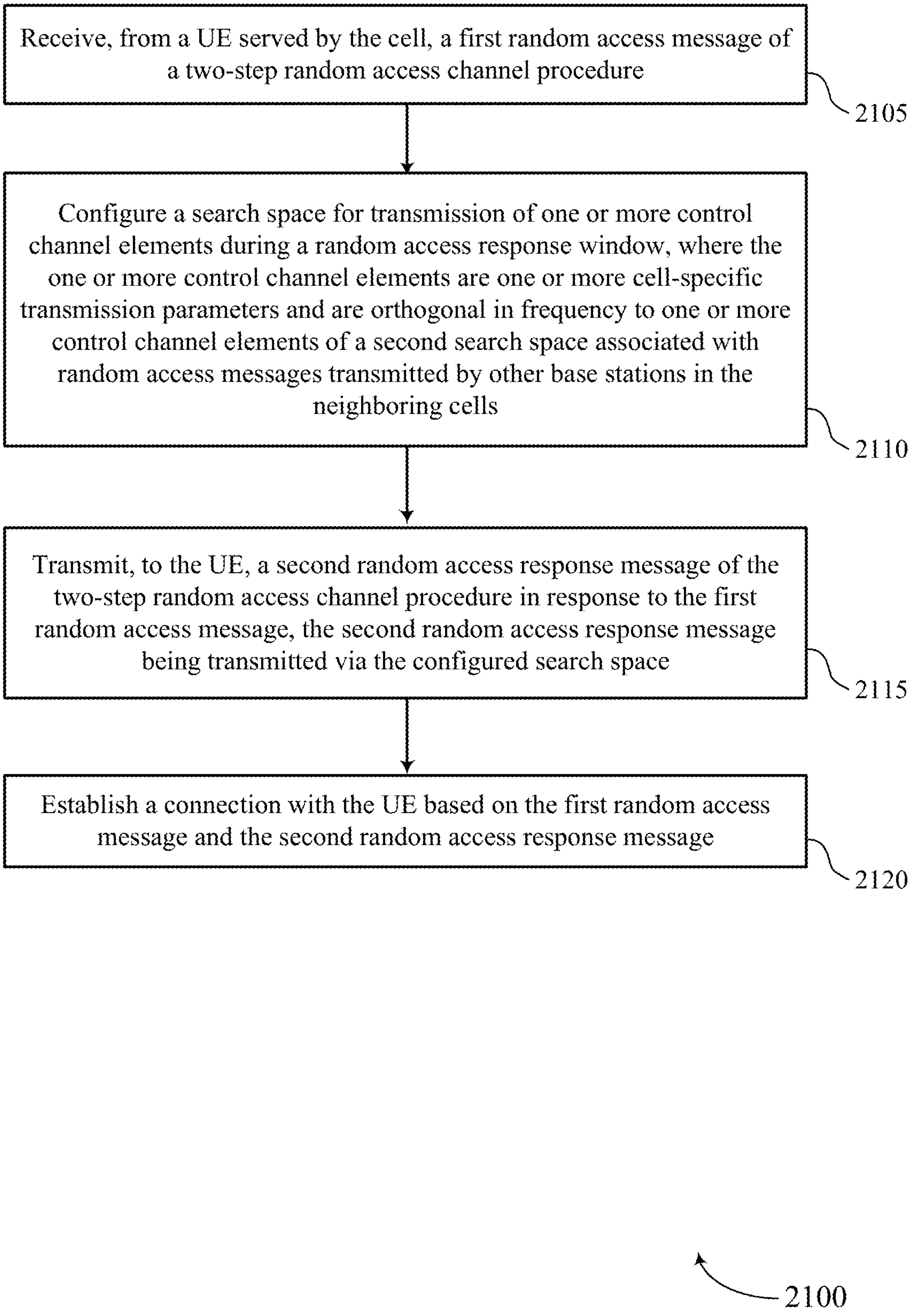

FIG. 21 shows a flowchart illustrating a method 2100 that supports interference management for two-step random access in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2105, the base station may receive, from a UE served by the cell, a first random access message of a two-step random access channel procedure. The operations of 2105 may be performed according to the methods described herein. In some examples, aspects of the operations of 2105 may be performed by a message component as described with reference to FIGS. 11 through 14.

At 2110, the base station may configure a search space for transmission of one or more control channel elements during a random access response window, where the one or more control channel elements are one or more cell-specific transmission parameters and are orthogonal in frequency to one or more control channel elements of a second search space associated with random access messages transmitted by other base stations in the neighboring cells. The operations of 2110 may be performed according to the methods described herein. In some examples, aspects of the operations of 2110 may be performed by a search space component as described with reference to FIGS. 11 through 14.

At 2115, the base station may transmit, to the UE, a second random access response message of the two-step random access channel procedure in response to the first random access message, the second random access response message being transmitted via the configured search space. The operations of 2115 may be performed according to the methods described herein. In some examples, aspects of the operations of 2115 may be performed by a message component as described with reference to FIGS. 11 through 14.

At 2120, the base station may establish a connection with the UE based on the first random access message and the second random access response message. The operations of 2120 may be performed according to the methods described herein. In some examples, aspects of the operations of 2120 may be performed by a connection component as described with reference to FIGS. 11 through 14.

Figure 22:
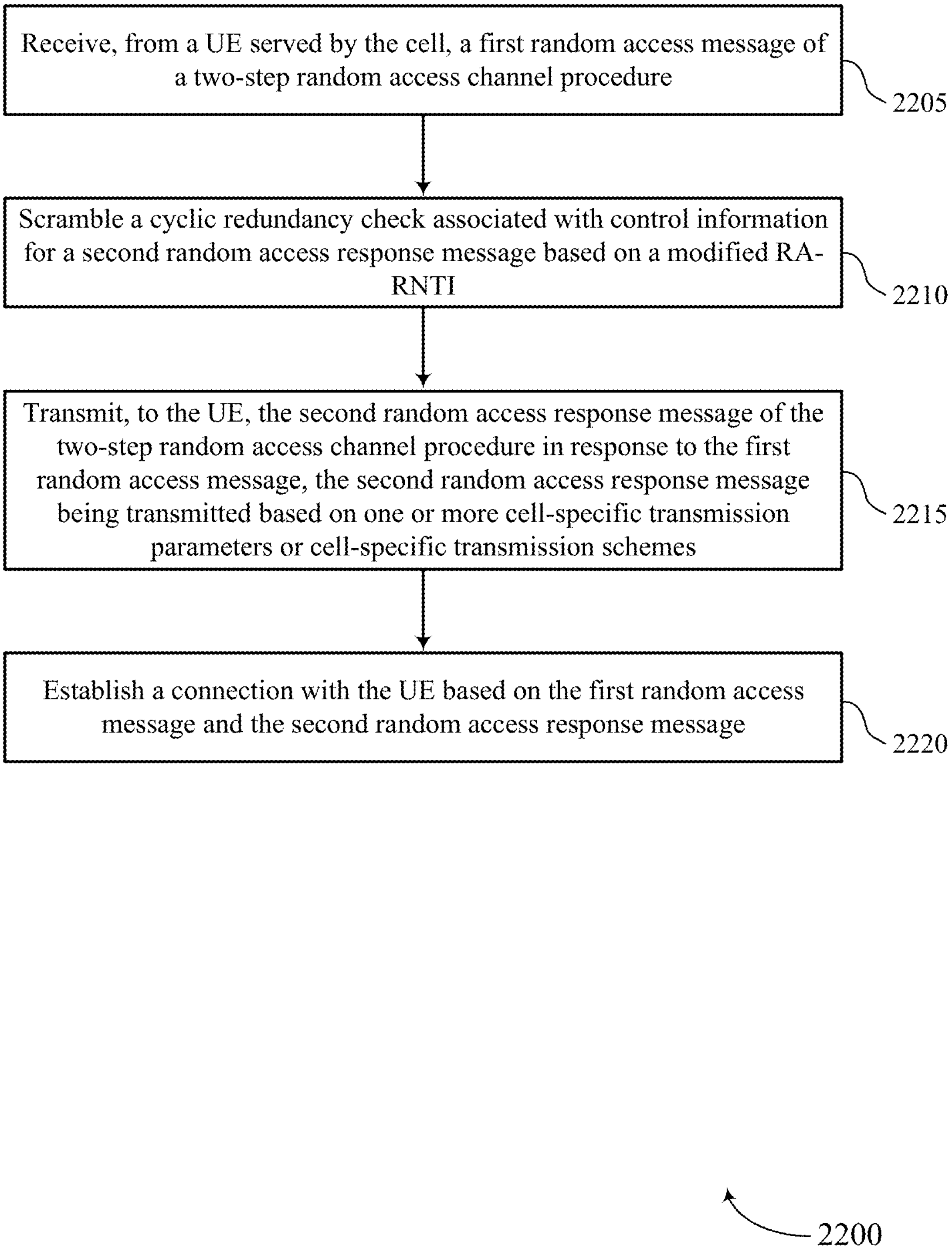

FIG. 22 shows a flowchart illustrating a method 2200 that supports interference management for two-step random access in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 2205, the base station may receive, from a UE served by the cell, a first random access message of a two-step random access channel procedure. The operations of 2205 may be performed according to the methods described herein. In some examples, aspects of the operations of 2205 may be performed by a message component as described with reference to FIGS. 11 through 14.

At 2210, the base station may scramble a cyclic redundancy check associated with control information for a second random access response message based on a modified RA-RNTI. The operations of 2210 may be performed according to the methods described herein. In some examples, aspects of the operations of 2210 may be performed by a scrambling component as described with reference to FIGS. 11 through 14.

At 2215, the base station may transmit, to the UE, a second random access response message of the two-step random access channel procedure in response to the first random access message, the second random access response message being transmitted based on one or more cell-specific transmission parameters or cell-specific transmission schemes. The operations of 2215 may be performed according to the methods described herein. In some examples, aspects of the operations of 2215 may be performed by a message component as described with reference to FIGS. 11 through 14.

At 2220, the base station may establish a connection with the UE based on the first random access message and the second random access response message. The operations of 2220 may be performed according to the methods described herein. In some examples, aspects of the operations of 2220 may be performed by a connection component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

EXAMPLE 1

A method for wireless communication at a user equipment (UE) in a cell, comprising: transmitting, to a base station serving the cell, a first random access message of a two-step random access procedure, the first random access message including a random access preamble and a random access payload, at least one of the random access preamble or the random access payload being transmitted based at least in part on one or more cell-specific transmission parameters or cell-specific transmission schemes; receiving, from the base station, a second random access response message of the two-step random access procedure in response to the first random access message; and establishing a connection with the base station based at least in part on the first random access message and the second random access response message.

EXAMPLE 2

The method of example 1, further comprising: receiving a cell-specific configuration for transmission of the random access preamble; and identifying, from the cell-specific configuration, one or more random access preamble transmission occasions, wherein the one or more random access preamble transmission occasions comprise time domain resources, frequency domain resources, or both, at least one of the time domain resources or frequency domain resources being the one or more cell-specific transmission parameters, wherein transmitting the first random access message comprises: transmitting the random access preamble on a physical random access channel (PRACH) during the one or more random access preamble transmission occasions.

EXAMPLE 3

The method of any of examples 1 or 2, further comprising: identifying a time domain offset or a frequency domain offset, or both, between the one or more random access preamble transmission occasions and a corresponding random access payload transmission occasion, wherein the one or more cell-specific transmission parameters comprise the time domain offset or the frequency domain offset, wherein transmitting the first random access message comprises: transmitting the random access payload on a physical uplink shared channel (PUSCH) in a random access payload transmission occasion based at least in part on the time domain offset or the frequency domain offset, or both.

EXAMPLE 4

The method of any of examples 1 to 3, wherein identifying the time domain offset or the frequency domain offset, or both, comprises: determining the time domain offset or the frequency domain offset, or both, based at least in part on a cell identifier of the cell.

EXAMPLE 5

The method of any of examples 1 to 4, wherein identifying the time domain offset or the frequency domain offset, or both, comprises: receiving a cell-specific configuration that includes the time domain offset, the frequency domain offset, or both.

EXAMPLE 6

The method of any of examples 1 to 5, further comprising: identifying a hopping sequence for transmission of the random access payload, wherein the hopping sequence is based at least in part on a time domain offset or a frequency domain offset, or both, between the random access preamble and the random access payload, wherein the one or more cell-specific transmission parameters include the time and frequency resources used for one or more transmission occasions defined by the hopping sequence, wherein transmitting the first random access message comprises: transmitting the random access payload on a physical uplink shared channel (PUSCH) in a random access payload transmission occasion based at least in part on the hopping sequence.

EXAMPLE 7

The method of any of examples 1 to 6, wherein identifying the hopping sequence comprises: determining the time domain offset or the frequency domain offset, or both, based at least in part on a cell identifier of the cell and one or more pseudo-random sequences.

EXAMPLE 8

The method of any of examples 1 to 7, wherein generation of at least one of the one or more pseudo-random sequences is based at least in part on the cell identifier.

EXAMPLE 9

The method of any of examples 1 to 8, wherein identifying the hopping sequence comprises: receiving a cell-specific configuration for the hopping sequence.

EXAMPLE 10

The method of any of examples 1 to 9, further comprising: determining a random access radio network temporary identifier based at least in part on a cell identifier; and scrambling information bits of the random access payload based at least in part on the random access radio network temporary identifier, wherein a scrambling sequence applied to information bits of the random access payload is a function of the cell identifier and ae UE identifier, wherein transmitting the first random access message comprises: transmitting the scrambled information bits of the random access payload after channel coding.

EXAMPLE 11

The method of any of examples 1 to 10, wherein scrambling the random access payload further comprises: scrambling the information bits of the random access payload based at least in part on a random access preamble identifier.

EXAMPLE 12

The method of any of examples 1 to 11, wherein scrambling the information bits of the random access payload further comprises: scrambling the information bits of the random access payload based at least in part on a port index of a demodulation reference signal.

EXAMPLE 13

The method of any of examples 1 to 12, determining a transmission power for transmission of the first random access message based at least in part on a pathloss compensation factor, wherein the one or more cell-specific transmission parameters include the pathloss compensation factor and the pathloss compensation factor and is different from neighboring cell pathloss compensation factors used by other UEs in neighboring cells during same transmission occasions, wherein transmitting the first random access message comprises: transmitting the first random access message based at least in part on the transmission power.

EXAMPLE 14

The method of any of examples 1 to 13, wherein the pathloss compensation factor is based at least in part on a value of a transmission occasion of the first random access message.

EXAMPLE 15

The method of any of examples 1 to 14, wherein receiving the second random access response message comprises: monitoring a search space for one or more control channel elements during a random access response window, wherein the one or more control channel elements are orthogonal in frequency to one or more control channel elements of a second search space associated with other UEs of neighboring cells.

EXAMPLE 16

The method of any of examples 1 to 15, wherein receiving the second random access response message comprises: descrambling a cyclic redundancy check associated with control information for the second random access response message based at least in part on a random access radio network temporary identifier or a cell identifier, or both, wherein the random access radio network temporary identifier is based at least in part on the cell identifier.

EXAMPLE 17

The method of any of examples 1 to 16, wherein the random access radio network temporary identifier is used for a radio resource control idle mode, a radio resource control inactive mode, and a radio resource connected mode.

EXAMPLE 18

The method of any of examples 1 to 17, further comprising: scrambling, for a first hop of the hopping sequence, information bits of the random access payload based at least in part on a first scrambling sequence that is a function of a first initialization value; scrambling, for a second hop of the hopping sequence, information bits of a second random access payload based at least in part on a second scrambling sequence that is a function of a second initialization value; and transmitting the random access payload on the PUSCH in a second random access payload transmission occasion based at least in part on the hopping sequence.

EXAMPLE 19

An apparatus for wireless communications comprising a processor; memory in electronic communication with the processor; and instructions stored in the memory and executable by the processor to cause the apparatus to perform a method of any of examples 1 to 18.

EXAMPLE 20

A non-transitory computer-readable medium storing code for wireless communications, the code comprising instructions executable by a processor to perform a method of any of examples 1 to 18.

EXAMPLE 21

An apparatus, comprising means for performing the method of any of examples 1 to 18.

EXAMPLE 22

A method for wireless communication at a base station serving a cell, comprising: receiving, from a user equipment (UE) served by the cell, a first random access message of a two-step random access channel procedure; transmitting, to the UE, a second random access response message of the two-step random access channel procedure in response to the first random access message, the second random access response message being transmitted based at least in part on one or more cell-specific transmission parameters or cell-specific transmission schemes; and establishing a connection with the UE based at least in part on the first random access message and the second random access response message.

EXAMPLE 23

The method of example 22, wherein transmitting the second random access response message comprises: configuring a search space for transmission of one or more control channel elements during a random access response window, wherein the one or more control channel elements are the one or more cell-specific transmission parameters and are orthogonal in frequency to one or more control channel elements of a second search space associated with random access messages transmitted by other base stations in neighboring cells.

EXAMPLE 24

The method of any of examples 22 or 23, wherein transmitting the second random access response message comprises: scrambling a cyclic redundancy check associated with control information for the second random access response message based at least in part on a random access radio network temporary identifier or a cell identifier, or both, wherein the random access radio network temporary identifier is based at least in part on the cell identifier and the scrambled cyclic redundancy check is the cell-specific transmission schemes.

EXAMPLE 25

The method of any of examples 22 to 24, wherein receiving the first random access message comprises: receiving a random access preamble and a random access payload, at least one of the random access preamble or the random access payload being received based at least in part on the one or more cell-specific transmission parameters or cell-specific transmission schemes that are different from random access transmission parameters or schemes used by other UEs in neighboring cells.

EXAMPLE 26

The method of any of examples 22 to 25, further comprising: transmitting a cell-specific configuration to the UE for transmission of the random access preamble, wherein the cell-specific configuration comprises one or more random access preamble transmission occasions, wherein the one or more random access preamble transmission occasions comprise time domain resources, frequency domain resources, or both, at least one of the time domain resources or frequency domain resources being different from resources used for random access preamble transmissions by other UEs in neighboring cells, wherein receiving the first random access message comprises: receiving the random access preamble on a physical random access channel (PRACH) during the one or more random access preamble transmission occasions.

EXAMPLE 27

The method of any of examples 22 to 26, further comprising: identifying a time domain offset or a frequency domain offset, or both, between the one or more random access preamble transmission occasions and a corresponding random access payload transmission occasion, wherein at least one of the time domain offset or the frequency domain offset is different from offsets used for random access payload transmission occasions by other UEs in neighboring cells, wherein receiving the first random access message comprises: receiving the random access payload on a physical uplink shared channel (PUSCH) in a random access payload transmission occasion based at least in part on the time domain offset or the frequency domain offset, or both.

EXAMPLE 28

The method of any of examples 22 to 27, wherein identifying the time domain offset or the frequency domain offset, or both, comprises: determining the time domain offset or the frequency domain offset, or both, based at least in part on a cell identifier of the cell.

EXAMPLE 29

The method of any of examples 22 to 28, identifying a hopping sequence for reception of the random access payload, wherein the hopping sequence is based at least in part on a time domain offset or a frequency domain offset, or both, between the random access preamble and the random access payload, wherein resources used for one or more transmission occasions defined by the hopping sequence are different from resources used for random access payload transmissions by other UEs in neighboring cells, wherein receiving the first random access message comprises: receiving the random access payload on a physical uplink shared channel (PUSCH) in a random access payload transmission occasion based at least in part on the hopping sequence.

EXAMPLE 30

The method of any of examples 22 to 29, wherein identifying the hopping sequence comprises: determining the time domain offset or the frequency domain offset, or both, based at least in part on a cell identifier of the cell and one or more pseudo-random sequences.

EXAMPLE 31

The method of any of examples 22 to 30, wherein generation for at least one of the one or more pseudo-random sequences is based at least in part on the cell identifier.

EXAMPLE 32

The method of any of examples 22 to 31, further comprising: determining a random access radio network temporary identifier based at least in part on a cell identifier of the cell; and descrambling information bits of the random access payload based at least in part on the random access radio network temporary identifier, wherein receiving the first random access message comprises: receiving the descrambled information bits of the random access payload.

EXAMPLE 33

The method of any of examples 22 to 32, wherein descrambling the information bits of the random access payload further comprises: descrambling the information bits of the random access payload based at least in part on a random access preamble identifier.

EXAMPLE 34

The method of any of examples 22 to 33, wherein descrambling the information bits of the random access payload further comprises: descrambling the random access payload based at least in part on a port index of demodulation reference signal.

EXAMPLE 35

The method of any of examples 22 to 34, wherein receiving the first random access message comprises: receiving the first random access message at a received power that is stronger than an interference from random access messages transmitted by other UEs of neighboring cells.

EXAMPLE 36

The method of any of examples 22 to 35, further comprising: transmitting, to the UE, a first set of parameters for transmitting the first random access message, wherein the first set of parameters comprise power control parameters, cell-specific transmission parameters, cell specific transmission schemes, or any combination thereof.

EXAMPLE 37

An apparatus for wireless communications comprising a processor; memory in electronic communication with the processor; and instructions stored in the memory and executable by the processor to cause the apparatus to perform a method of any of examples 20 to 36.

EXAMPLE 38

A non-transitory computer-readable medium storing code for wireless communications, the code comprising instructions executable by a processor to perform a method of any of examples 20 to 36.

EXAMPLE 39

An apparatus, comprising means for performing the method of any of examples 20 to 36.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto cNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) in a cell, comprising:

one or more memories storing processor-executable code; and one or more processors coupled with the one or more memories and individually or collectively operable to execute the code to cause the UE to:

transmit, to a base station serving the cell, a first random access message of a two-step random access procedure, the first random access message including a random access preamble and a random access payload, wherein information bits of the random access payload are scrambled in accordance with a scrambling sequence, wherein the scrambling sequence is based at least in part on a random access radio network temporary identifier, a preamble identifier, and a cell identifier;

receive, from the base station, a second random access response message of the two-step random access procedure in response to the first random access message;

establish a connection with the base station based at least in part on the first random access message and the second random access response message;

receive a cell-specific configuration for transmission of the random access preamble, wherein the cell-specific configuration comprises one or more cell-specific transmission parameters; and identify, from the cell-specific configuration, one or more random access preamble transmission occasions, wherein the one or more random access preamble transmission occasions comprise time domain resources, frequency domain resources, or both, at least one of the time domain resources or frequency domain resources being a cell-specific transmission parameter for the cell-specific configuration, wherein, to transmit the first random access message, the one or more processors are individually or collectively further operable to execute the code to cause the UE to:

transmit the random access preamble on a physical random access channel (PRACH) during the one or more random access preamble transmission occasions.

2. The UE of claim 1, wherein the one or more processors are individually or collectively further operable to execute the code to cause the UE to:

determine the random access radio network temporary identifier based at least in part on the cell identifier, wherein the first random access message is transmitted after channel coding.

3. The UE of claim 1, wherein, to scramble the information bits of the random access payload, the one or more processors are individually or collectively further operable to execute the code to cause the UE to:

scramble the information bits of the random access payload based at least in part on a port index of a demodulation reference signal, wherein the scrambling sequence is based at least in part on the port index of the demodulation reference signal.

4. The UE of claim 1, wherein the random access radio network temporary identifier is used for a radio resource control idle mode, a radio resource control inactive mode, and a radio resource connected mode.

5. The UE of claim 1, wherein the one or more processors are individually or collectively further operable to execute the code to cause the UE to:

identify a time domain offset or a frequency domain offset, or both, between the one or more random access preamble transmission occasions and a corresponding random access payload transmission occasion, wherein the one or more cell-specific transmission parameters comprise the time domain offset or the frequency domain offset, wherein, to transmit the first random access message, the one or more processors are individually or collectively further operable to execute the code to cause the UE to:

transmit the random access payload on a physical uplink shared channel (PUSCH) in a random access payload transmission occasion based at least in part on transmitting the random access preamble on the PRACH and the time domain offset or the frequency domain offset, or both.

6. The UE of claim 5, wherein to identify the time domain offset or the frequency domain offset, or both, the one or more processors are individually or collectively further operable to execute the code to cause the UE to:

determine the time domain offset or the frequency domain offset, or both, based at least in part on the cell identifier of the cell, wherein the time domain offset is an offset in a quantity of slots with respect to a start of the random access preamble in the PRACH and the frequency domain offset is an offset in a quantity of resource blocks with respect to the start of the random access preamble in the PRACH.

7. The UE of claim 5, wherein to identify the time domain offset or the frequency domain offset, or both, the one or more processors are individually or collectively further operable to execute the code to cause the UE to:

receiving, in the cell-specific configuration, an indication of the time domain offset, the frequency domain offset, or both.

8. The UE of claim 1, wherein the one or more processors are individually or collectively further operable to execute the code to cause the UE to:

identify a hopping sequence for transmission of the random access payload, wherein the hopping sequence is based at least in part on a time domain offset or a frequency domain offset, or both, between the random access preamble and the random access payload, wherein the first random access message is based at least in part on cell-specific time and frequency resources used for one or more transmission occasions defined by the hopping sequence, wherein, to transmit the first random access message, the one or more processors are individually or collectively further operable to execute the code to cause the UE to:

transmit the random access payload on a physical uplink shared channel (PUSCH) in a random access payload transmission occasion based at least in part on the hopping sequence.

9. The UE of claim 8, wherein, to identify the hopping sequence, the one or more processors are individually or collectively further operable to execute the code to cause the UE to:

determine the time domain offset or the frequency domain offset, or both, based at least in part on the cell identifier of the cell and one or more pseudo-random sequences.

10. The UE of claim 9, wherein generation of at least one of the one or more pseudo-random sequences is based at least in part on the cell identifier.

11. The UE of claim 8, wherein, to identify the hopping sequence, the one or more processors are individually or collectively further operable to execute the code to cause the UE to:

receive a cell-specific configuration for the hopping sequence.

12. The UE of claim 8, wherein the one or more processors are individually or collectively further operable to execute the code to cause the UE to:

scramble, for a first hop of the hopping sequence, the information bits of the random access payload based at least in part on a first scrambling sequence that is a function of a first initialization value;

scramble, for a second hop of the hopping sequence, information bits of a second random access payload based at least in part on a second scrambling sequence that is a function of a second initialization value; and transmit the random access payload on the PUSCH in a second random access payload transmission occasion based at least in part on the hopping sequence.

13. The UE of claim 1, wherein the one or more processors are individually or collectively further operable to execute the code to cause the UE to:

determine a transmission power for transmission of the first random access message based at least in part on a pathloss compensation factor, wherein the pathloss compensation factor is different from neighboring cell pathloss compensation factors used by other UEs in neighboring cells during same transmission occasions, wherein, to transmit the first random access message, the one or more processors are individually or collectively further operable to execute the code to cause the UE to:

transmit the first random access message based at least in part on the transmission power.

14. The UE of claim 13, wherein the pathloss compensation factor is based at least in part on a value of a transmission occasion of the first random access message.

15. A method for wireless communication at a user equipment (UE) in a cell, comprising:

transmitting, to a base station serving the cell, a first random access message of a two-step random access procedure, the first random access message including a random access preamble and a random access payload, wherein information bits of the random access payload are scrambled in accordance with a scrambling sequence, wherein the scrambling sequence is based at least in part on a random access radio network temporary identifier, a preamble identifier, and a cell identifier;

receiving, from the base station, a second random access response message of the two-step random access procedure in response to the first random access message;

establishing a connection with the base station based at least in part on the first random access message and the second random access response message;

receiving a cell-specific configuration for transmission of the random access preamble, wherein the cell-specific configuration comprises one or more cell-specific transmission parameters; and identifying, from the cell-specific configuration, one or more random access preamble transmission occasions, wherein the one or more random access preamble transmission occasions comprise time domain resources, frequency domain resources, or both, at least one of the time domain resources or frequency domain resources being a cell-specific transmission parameter for the cell-specific configuration, wherein, transmitting the first random access message, comprises transmitting the random access preamble on a physical random access channel (PRACH) during the one or more random access preamble transmission occasions.

16. The method of claim 15, further comprising:

determining the random access radio network temporary identifier based at least in part on the cell identifier, wherein the first random access message is transmitted after channel coding.

17. The method of claim 15, wherein scrambling the information bits of the random access payload further comprises:

scrambling the information bits of the random access payload based at least in part on a port index of a demodulation reference signal, wherein the scrambling sequence is based at least in part on the port index of the demodulation reference signal.

18. The method of claim 15, wherein the random access radio network temporary identifier is used for a radio resource control idle mode, a radio resource control inactive mode, and a radio resource connected mode.

19. A non-transitory computer-readable medium storing code for wireless communication in a cell, the code comprising instructions executable by one or more processors to:

transmit, to a base station serving the cell, a first random access message of a two-step random access procedure, the first random access message including a random access preamble and a random access payload, wherein information bits of the random access payload are scrambled in accordance with a scrambling sequence, wherein the scrambling sequence is based at least in part on a random access radio network temporary identifier, a preamble identifier, and a cell identifier;

receive, from the base station, a second random access response message of the two-step random access procedure in response to the first random access message;

establish a connection with the base station based at least in part on the first random access message and the second random access response message;

receive a cell-specific configuration for transmission of the random access preamble, wherein the cell-specific configuration comprises one or more cell-specific transmission parameters; and identify, from the cell-specific configuration, one or more random access preamble transmission occasions, wherein the one or more random access preamble transmission occasions comprise time domain resources, frequency domain resources, or both, at least one of the time domain resources or frequency domain resources being a cell-specific transmission parameter for the cell-specific configuration, wherein, to transmit the first random access message, the code comprises instructions executable by the one or more processors to:

transmit the random access preamble on a physical random access channel (PRACH) during the one or more random access preamble transmission occasions.

* * * * *